(12) United States Patent
Tang et al.

(10) Patent No.: US 9,065,524 B2
(45) Date of Patent: Jun. 23, 2015

(54) METHOD, APPARATUS, RECEIVER, COMPUTER PROGRAM AND STORAGE MEDIUM FOR JOINT DETECTION

(75) Inventors: Zhixun Tang, Beijing (CN); Xie Li, Beijing (CN); Liping Zhang, Beijing (CN); Daijun Zhang, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/351,799

(22) PCT Filed: Oct. 14, 2011

(86) PCT No.: PCT/CN2011/080775
§ 371 (c)(1),
(2), (4) Date: Apr. 22, 2014

(87) PCT Pub. No.: WO2013/053129
PCT Pub. Date: Apr. 18, 2013

(65) Prior Publication Data
US 2014/0294127 A1 Oct. 2, 2014

(51) Int. Cl.
*H04B 1/12* (2006.01)
*H04B 1/7105* (2011.01)
*H04B 1/7107* (2011.01)

(52) U.S. Cl.
CPC ............... *H04B 1/12* (2013.01); *H04B 1/7105* (2013.01); *H04B 1/7107* (2013.01)

(58) Field of Classification Search
CPC ........................... H04B 1/7105; H04B 1/7107
See application file for complete search history.

(56) References Cited

U.S. PATENT DOCUMENTS

| 2008/0080645 | A1* | 4/2008 | Kocic et al. | 375/340 |
| 2012/0257548 | A1* | 10/2012 | Yan et al. | 370/280 |
| 2013/0070833 | A1* | 3/2013 | Yan et al. | 375/231 |

(Continued)

FOREIGN PATENT DOCUMENTS

| CN | 101247159 A | 8/2008 |
| CN | 102215514 A | 10/2011 |
| KR | 2010116873 A | 11/2010 |

OTHER PUBLICATIONS

Zen Rong, "Channel Estimation aided Active Codes Detection Algorithm in TD-SCDMA Systems",Institute of Telecommunication, Hangzhou Dianzi University, P.R.China, IEEE 2009.*

(Continued)

*Primary Examiner* — Aristocratis Fotakis
(74) *Attorney, Agent, or Firm* — Coats & Bennett, PLLC

(57) ABSTRACT

The present invention relates a method, apparatus, receiver, computer program for joint detection. In the method, it is firstly determined if whether a number of original active codes is beyond a predefined threshold or not, and when the number of the original active codes is beyond the predefined threshold and a strong interference code exists in the active codes corresponding to intra-frequency adjacent cells, it is to apply an interference cancellation to a receive signal, cancel MAI caused by a strong interference signal corresponding to the strong interference code, and perform a joint detection by utilizing a matched filtering result of a remaining signal after the interference cancellation for the joint detection. According to at least one embodiment of the present invention, when there is large interference in the intra-frequency adjacent cells and the number of the active codes is beyond a maximum threshold, the joint detection performance is improved.

29 Claims, 11 Drawing Sheets

(56) References Cited

U.S. PATENT DOCUMENTS

2013/0094476 A1* 4/2013 Hao et al. .................. 370/335
2013/0142128 A1* 6/2013 Yang et al. .................. 370/329

OTHER PUBLICATIONS

Klein, A. et al., "Zero Forcing and Minimum Mean-Square-Error Equalization for Multiuser Detection in Code-Division Multiple-Access Channels." IEEE Transactions on Vehicular Technology, vol. 45, No. 2, May 1996. IEEE, Piscataway, NJ.

International Search Report, International Application No. PCT/CN2011/080775. Date of mailing: Jul. 26, 2012. SIPO, Beijing, China.

3rd Generation Partnership Project, "Technical Specification Group Radio Access Network; Physical channels and mapping of transport channels onto physical channels (FDD) (Release 10)", 3GPP TS 25.211 V10.0.0, Sep. 2010, pp. 1-58.

3rd Generation Partnership Project, "Technical Specification Group Radio Access Network; Spreading and modulation (TDD) (Release 10)", 3GPP TS 25.223 V10.1.0, Sep. 2011, pp. 1-54.

* cited by examiner

METHOD, APPARATUS, RECEIVER, COMPUTER PROGRAM AND STORAGE MEDIUM FOR JOINT DETECTION

FIELD OF THE INVENTION

The present invention relates to a wireless communication field, specially relates to a method, apparatus, receiver, computer program and storage medium for joint detection.

DESCRIPTION OF THE PRIOR ART

Even though embodiments of the invention will be described herein in relation to Time Division-Synchronous Code Division Multiple Access (TD-SCDMA), it should be noted that embodiments of the invention may be equally applicable in other scenarios. Thus, the invention is not limited to TD-SCDMA.

In a Time Division-Synchronous Code Division Multiple Access (TD-SCDMA) system, since different signals have different propagation time delays (and since scramble codes exists when using CDMA technique), spreading codes used by respective signals are not completely orthogonal at reception. Interference caused by non-zero correlation coefficient is referred to as Multiple Access Interference (MAI). A Matched Filter (MF) or a Multi-user Detector (MUD) (joint detector (JD)) is commonly used to recover a signal in such embodiments. A conventional matched filter may not efficiently suppress MAI. Multi-user detection may properly cancel the effect of MAI.

The conventional joint detection has the following problems: when interference from intra-frequency adjacent cells is large and the number of active codes in the cell and the intra-frequency adjacent cells is beyond a maximum threshold (typically e.g. 16 active codes) processed by the joint detection, the performance of the joint detection may dramatically degrade.

SUMMARY OF THE INVENTION

Embodiments of the present invention disclose a method, apparatus, receiver, computer program and storage medium for joint detection. When there is a large interference in the intra-frequency adjacent cells and the number of the active codes in the cell and the intra-frequency adjacent cells is beyond the maximum threshold for the joint detection, the performance of the joint detection is improved. Meanwhile, the tolerance of codes demodulated by the joint detection is increased.

In some embodiments of the present invention, it is determined if a number of original active codes corresponding to a cell and intra-frequency adjacent cells is beyond a first threshold or not, when the number of the original active codes is not beyond the first threshold, an existing joint detection method is used to jointly detect a matched filtering result of a received signal, and when the number of the original active codes is beyond the first threshold and strong interference codes exits in the active codes corresponding to the intra-frequency adjacent cells, an interference cancellation is applied to the received signal to cancel MAI caused by the strong interference signal corresponding to the strong interference codes, and the matched filtering result of the remaining signal after the interference cancellation is used for the joint detection. As a result, the performance of the joint detection is improved while the tolerance of codes demodulated by the joint detection is increased (the maximum possible number of codes demodulated increases from 16 to 16 plus the number of cancelled strong interference codes). When the number of the original active codes is beyond the first threshold and strong interference codes does not exit in the active codes corresponding to the intra-frequency adjacent cells, some embodiments reduce the number of the original active codes so that the number of the active codes after reducing is equal to the first threshold, and then joint detect the matched filtering result of the received signal by using the existing joint detection method.

An existing joint detection is referred to as an example only. Any suitable (currently known or future) joint detection may be used.

In some embodiments of the present invention, it is determined if the number of original active windows corresponding to a cell and intra-frequency adjacent cells is beyond a third threshold or not. When the number of the original active windows is not beyond the third threshold, an existing joint detection method is used to jointly detect the matched filtering result of the receive signal, when the number of the original active windows is beyond the third threshold and a strong interference window exits in active windows corresponding to the intra-frequency adjacent cells, the interference cancellation is applied to the received signal to cancel MAI caused by the strong interference signal corresponding to the strong interference codes and the matched filtering result of the remaining signal after the interference cancellation is used for the joint detection. As a result, the performance of the joint detection is improved while the tolerance of codes demodulated by the joint detection is increased (the maximum possible number of codes demodulated increases from 16 to 16 plus the number of the cancelled strong interference codes). When the number of the original active windows is beyond the third threshold and a strong interference window does not exit in active windows corresponding to the intra-frequency adjacent cells, it is to reduce the number of the original active windows so that the number of the active windows after reducing is equal to the first threshold, and then joint detect the matched filtering result of the received signal by using the existing joint detection method.

In some embodiments of the present invention, a matched filtering result of the remaining signal may be calculated by the following steps: calculating the remaining signal firstly, matched filtering the remaining signal, and obtaining the matched filtering result of the remaining signal. The existing hardware unit for the matched filtering may be reused in the above method, thus hardware cost is low.

In some embodiments of the present invention, the matched filtering result of the remaining signal may be calculated by the following steps: calculating a product of a conjugate transpose matrix of a system matrix of the remaining signal, a system matrix of a strong interference signal and the strong interference signal; and subtracting the product from the remaining part which is acquired by cancelling a part of a matched filtering result of a received signal corresponding to the strong interference signal from the matched filtering result of the receive signal, so as to obtain the matched filtering result of the remaining signal. This method may adopt an operation at symbol level. Therefore, the computation complexity is relatively low.

It is obvious that the present invention is not limited to the above features and advantages. A person skilled in the art will understand other features and advantages by reading the detail description of the preferred embodiments in conjunction with the accompanying figures.

DETAILED DESCRIPTION OF THE PREFERRED EMBODIMENTS

The theory of the joint detection method according to the embodiment of the present invention is simply explained as below.

The maximum number of active codes which can be processed by the existing joint detection is commonly 16. It is to be noted that the number 16 as a maximum number of codes possible to process by the joint detection is merely an example. Other maximum numbers may be equally possible depending, for example, on implementation conditions. When the number of the original active codes corresponding to the cell and the intra-frequency adjacent cells is not beyond (less than or equal to) 16, the existing joint detection method may be used to joint detect a receive signal. When the number of the original active codes is beyond 16, the received signal corresponding to the codes which are beyond 16 is treated as noise by the existing joint detection method. Since the joint detection is not applied to these interference signals from the intra-frequency adjacent cells, the demodulation performance decreases.

In an embodiment of the present invention, it is firstly determined whether the number of the active codes corresponding to the cell and the intra-frequency adjacent cells is beyond the maximum threshold which can be processed by the joint detection (commonly 16) or not. When the number of the original active codes is not beyond the maximum threshold, the existing joint detection method is used to process the receive signal. When the number of the original active codes is beyond the maximum threshold, strong interference signal corresponding to the intra-frequency adjacent cells is determined and an interference cancellation is applied to the strong interference signal to obtain the remaining signal without the strong interference signal. The joint detection is applied to the remaining signal finally. It is to be noted that any suitable (currently known or future) interference cancellation may be used.

The present invention will be described in detail by conjunction with the accompanying figures and embodiments.

Figure 1:
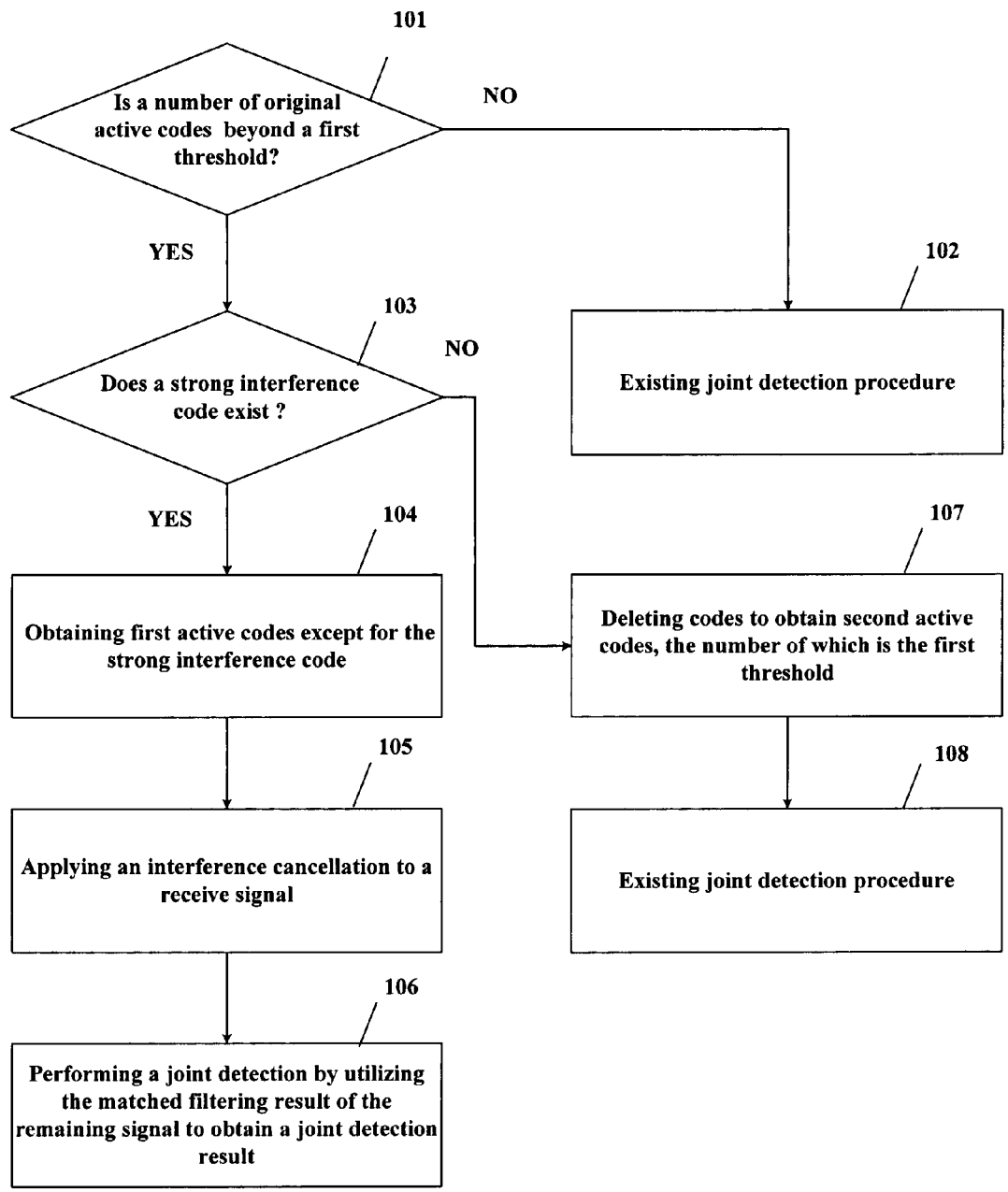
FIG. 1 shows a schematic flow chart of a joint detection method according to an embodiment of the present invention.

FIG. 1 is a schematics flow chart showing the joint detection method according to an embodiment of the present invention. The joint detection method comprises the following steps:

Step S101, determining if a number of original active codes corresponding to a cell and intra-frequency adjacent cells is beyond a first threshold or not, if the number of the original active codes is not beyond the first threshold, the process proceeds to Step S102, otherwise, the process proceeds to Step S103, wherein, the cell is a servicing cell where a user equipment (UE) is located, the first threshold is the maximum number of the active codes which can be processed by a joint detection, which is commonly 16;

Step S102, performing a joint detection by utilizing the original active codes and a matched filtering result of a received signal so as to obtain a joint detection result, that is, when the number of the original active codes is not beyond the first threshold, the process proceeds to the existing joint detection procedure;

Step S103, determining whether strong interference codes exists in the active codes corresponding to the intra-frequency adjacent cells or not, wherein a ratio of power of the strong interference codes and power of the active codes of the user is beyond a second threshold, and when the strong interference codes exists in the active codes corresponding to the intra-frequency adjacent cells, the process proceeds to step S104, otherwise the process proceeds to step S107, wherein the second threshold can be set as required;

Step S104, obtaining first active codes except for the strong interference codes from the original active codes, a number of the first active codes is not beyond the first threshold;

Step S105, applying an interference cancellation to the received signal to obtain a matched filtering result of the remaining signal excluding the strong interference signal corresponding to the strong interference codes;

Step S106, performing a joint detection by utilizing the first active codes and the matched filtering result of the remaining signal to obtain a joint detection result;

Step S107, sequencing power of the original active codes, cancelling the active codes except for the codes of the user in the original active codes to obtain a second active codes the number of which equals the first threshold;

Step S108, performing a joint detection by utilizing the second active codes and the matched filtering result of the receiving signal to obtain a joint detection result.

Figure 2:
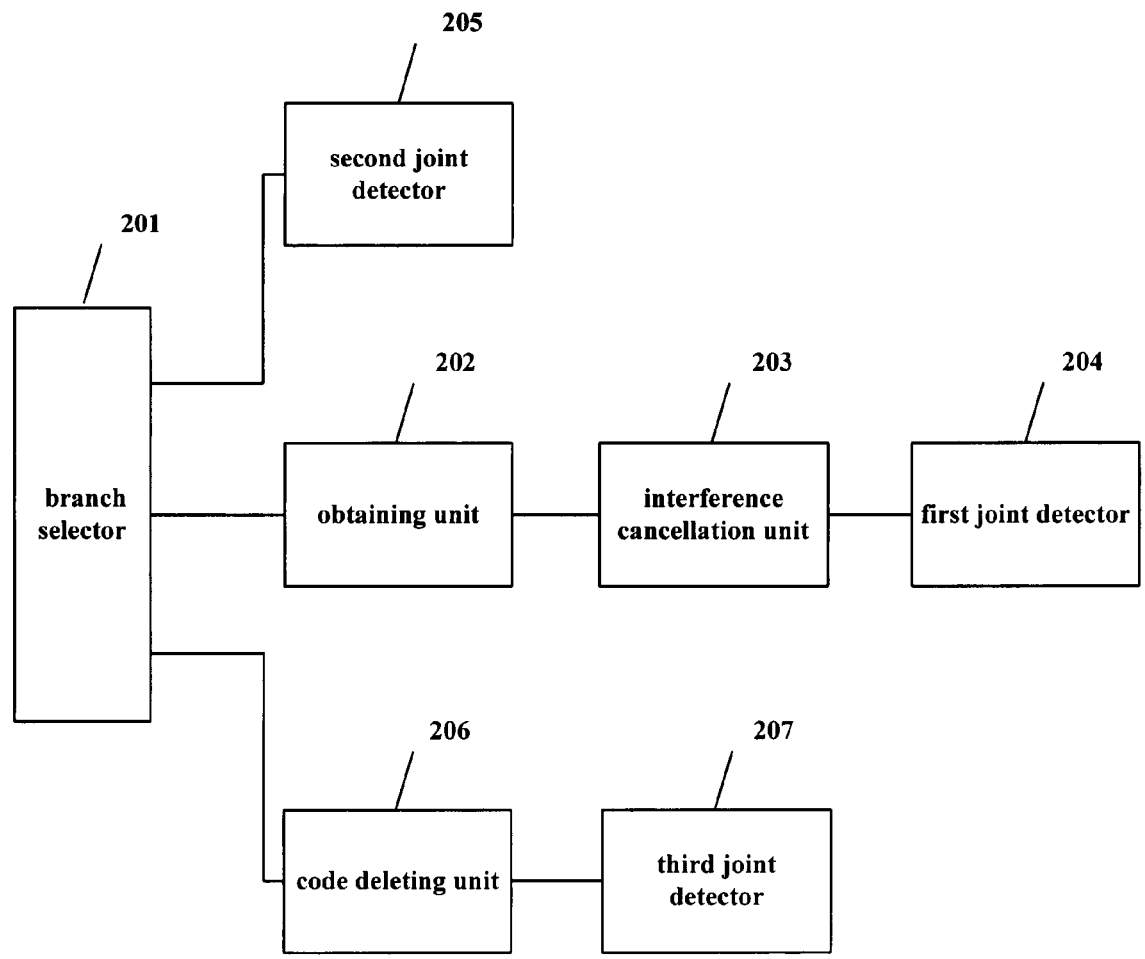
FIG. 2 shows a schematic diagram of a configuration of a joint detection device according to an embodiment of the present invention.

FIG. 2 shows a schematic diagram of a configuration of a joint detection device according to an embodiment of the present invention. The joint detection apparatus includes:

a branch selector 201, configured determined if a number of original active codes corresponding to a cell and intra-frequency adjacent cells is beyond a first threshold or not;

an obtaining unit 202, configured to, when the number of the original active codes is beyond the first threshold and strong interference codes exits in the active codes corresponding to the intra-frequency adjacent cells, obtain first active codes except for the strong interference codes in the original active codes, wherein, the number of the first active codes is not beyond the first threshold, a ratio of power of the strong interference codes to power of active codes of the user is beyond a second threshold;

an interference cancellation unit 203, configured to apply an interference cancellation to a received signal to obtain a matched filtering result of a remaining signal excluding the strong interference strong corresponding to the strong interference codes;

a first joint detector 204, configured to perform a joint detection by utilizing the first active codes and the matched filtering result of the remaining signal to obtain a first joint detection result;

a second joint detector 205, configured to, when the number of the original active codes is not beyond the first threshold, perform a joint detection by utilizing the original active codes and the matched filtering result of the received signal to obtain a second joint detection result;

a codes deleting unit 206, configured to, when the number of the active codes is beyond the first threshold and the strong interference codes does not exist in the active codes corresponding to the intra-frequency adjacent cells, sequencing power of the original active codes and deleting the active codes except for active codes of the user in the original active codes in the order from highest power to the lowest power to retain second active codes the number of which equals the first threshold; and a third joint detector 207, configured to perform a joint detection by utilizing the second active codes and the matched filtering result of the received signal to obtain a third joint detection result.

In the above embodiment, the three joint detectors (The first joint detector 204, the second joint detector 205 and the third joint detector 207) are used to illustrate the different joint detection processes under different conditions clearly, one or more joint detectors may be used to perform the functions of the three joint detectors.

Furthermore, an embodiment of the present invention relates to a receiver including the above joint detection apparatus.

The joint detection method and apparatus has the following beneficial effects.

When the number of the active codes used for the joint detection is not beyond a predefined threshold, the existing joint detection method is used. The existing joint detection method considers all users' signals in the cell and the intra-frequency adjacent cells so that the accuracy of the joint detection may be guaranteed.

When the number of the active codes used for the joint detection is beyond the predefined threshold, the strong interference signal is cancelled from the receive signal. Therefore, the joint detection result is more accurate. Furthermore, the tolerance of codes demodulated by the joint detection increases (from 16 to 16+N, N is the number of the strong interference codes).

Figure 3:
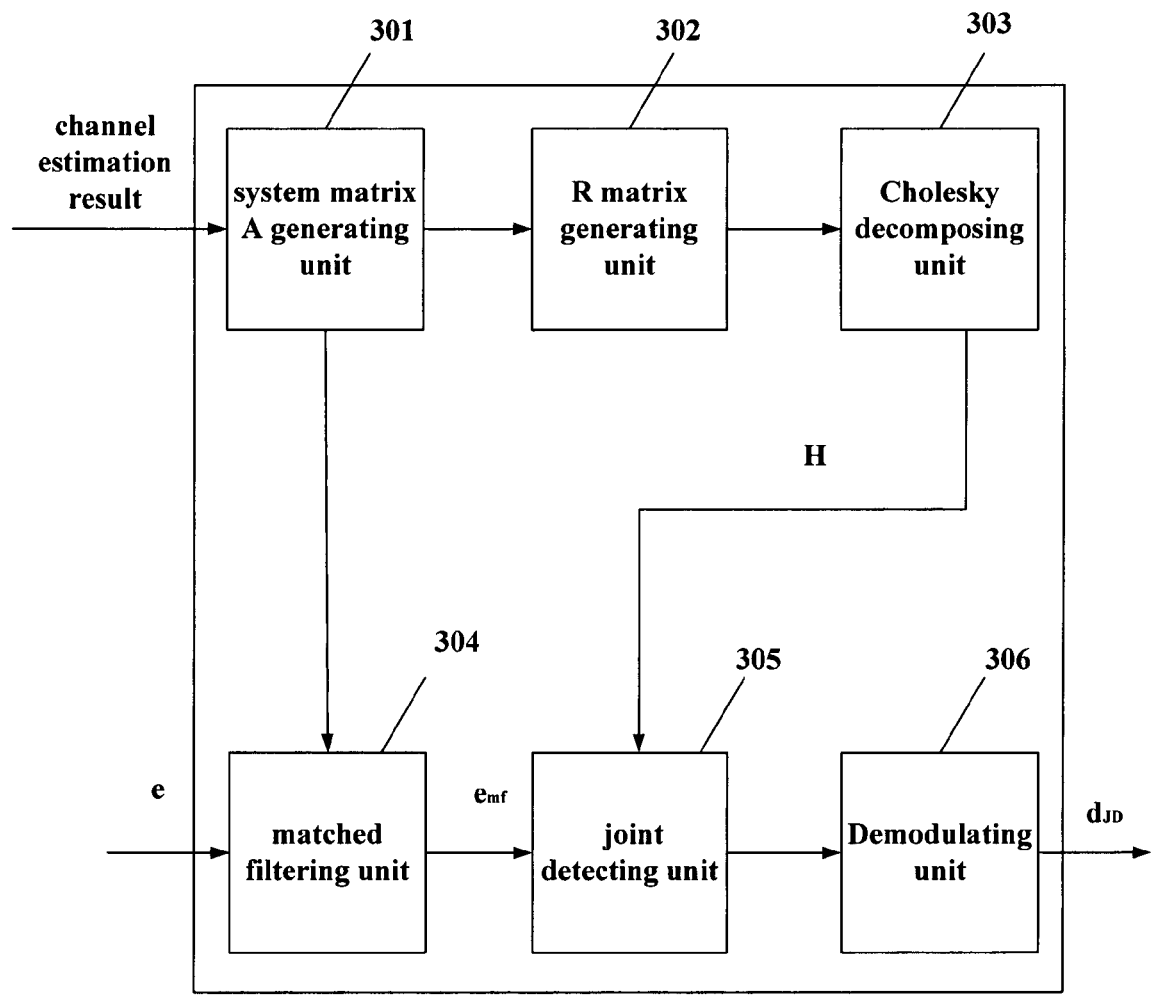
FIG. 3 shows a data flow of a joint detection according to an embodiment of the present invention.

When the active codes used for the joint detection is not beyond the predefined threshold, as shown in FIG. 3, the process of the joint detection according to the embodiment of the present invention is as following:

system matrix A generating unit 301 constructing a system matrix A by utilizing channel estimation result;

R matrix generating unit 302 obtaining R ($A^H A$) which is a correlation matrix of the system matrix A;

Cholesky decomposing unit 303 applying the Cholesky decomposition to the correlation matrix R to obtain a matrix H;

matched filtering unit 304 matched filtering the received signal e based on the system matrix A to obtain a matched filtering result $e_{mf}$ of the received signal e;

joint detecting unit 305 performing a joint detection based on the matched filtering result of the received signal $e_{mf}$ and the matrix H to obtaining a joint detection result; and demodulating unit 306 demodulating the joint detection result to obtain a demodulated result $d_{JD}$.

A linear Minimum Mean Square Error (MMSE) joint detection method is used in an embodiment of the present invention. The function is as following:

$$d_{JD}=(A^H A+\sigma^2 I)^{-1}e_{mf}=(HH^H)^{-1}e_{mf}$$

Where, $d_{JD}$ is the joint detection result. A is the system matrix, $\sigma^2$ is noise power estimation, I is a unit matrix, and $e_{mf}$ is the matched filtering result of the receive signal.

A linear Zero Forcing (ZF) algorithm may also be used for the joint detection. The function is as following:

$$d_{JD}=(A^H A)^{-1}e_{mf}=(HH^H)^{-1}e_{mf}$$

Where, $d_{JD}$ is the joint detection result, A is the system matrix, and $e_{mf}$ is the matched filtering result of the receive signal.

Of course, other linear or non-linear algorithms may be used for the joint detection.

In the above embodiments, the power of the active codes of the user is used determined if the strong interference codes. In an embodiment of the present invention, the power of the active codes of the user may be:

average power of all active codes of the user;

the maximum power of all active codes of the user; or power of any one of the active codes of the user.

Taking the maximum power of all active codes of the user as an example of the power of the active codes of the user, a method of determining strong interference codes according to an embodiment of the present invention is explained in detail.

The strong interference codes may be determined based on the following method:

Step 1, obtaining the maximum power $P_{code\_max}$ of all active codes of the user;

Step 2, calculating a ratio of the power of the active codes corresponding to the intra-frequency adjacent cells to the maximum power $P_{code\_max}$; and Step 3, taking the active codes with a ratio larger than the second threshold as the strong interference codes.

During the strong interference cancellation, the strong interference signal is firstly demodulated. In an embodiment of the present invention, there are various methods determined if whether the strong interference signal may be demodulated or not. That is determined if whether the strong interference codes determined above is real strong interference codes. A method employing power of cells determined if is explained here.

When a cell has strong power and other cells have weak power, MAI of other cells to the cell may be ignored. The strong interference codes in the cell may be accurately determined after a matched filtering. Based on the above concept, in an embodiment of the present invention, a ratio of average power of a first cell on which the determined strong interference codes is located to average power of the first adjacent cell is directly used determined if whether the strong interference signal may be demodulated or not. When the ratio of the power of the first cell to the power of its adjacent cell is larger than a predefined threshold, it is determined that the strong interference signal can be demodulated, the first cell is determined as the strong interference cell, and the active codes corresponding to the first cell is the strong interference codes. Otherwise it is determined that the strong interference signal cannot be demodulated, the first cell is not determined as the strong interference cell, and the active codes corresponding to the first cell is not the strong interference codes.

In an embodiment of the present invention, after the strong interference codes is determined, it is determined whether the number of the other active codes except for the strong interference codes in the original active codes corresponding to the cell and the intra-frequency adjacent cells is beyond the first threshold. When the number of other active codes is beyond the first threshold, the other active codes are deleted to obtain first active codes, wherein the number of the first active codes is equal to the first threshold. When the number of other active codes is not beyond the first threshold, the other active codes are directly used as the first active codes for the joint detection.

In the embodiment of the present invention, during the deleting, the power of other active codes excluding the strong interference codes is firstly obtained and sequenced, and the active codes with the lowest power are deleted from the other active codes excluding the active codes of the user, so that the first active codes, the number of which equals the first threshold, are remained.

Furthermore, in the embodiments, when the number of the original active codes corresponding to the cell and the intra-frequency adjacent cells is beyond the predefined threshold and the strong interference codes does not exist in the original active codes, the power of the original active codes are obtained and sequenced. The active codes except for the active codes of the user in the original active codes are deleted in the order from low power to high power to obtain second active codes, the number of codes of which is the first threshold.

The interference cancellation method according to the embodiment of the present invention is an interference cancellation technique based on interference reconstruction/subtraction. In this technique, the strong interference signal transmitted by the intra-frequency adjacent cells is reconstructed and subtracted from the receive signal.

Figure 4:
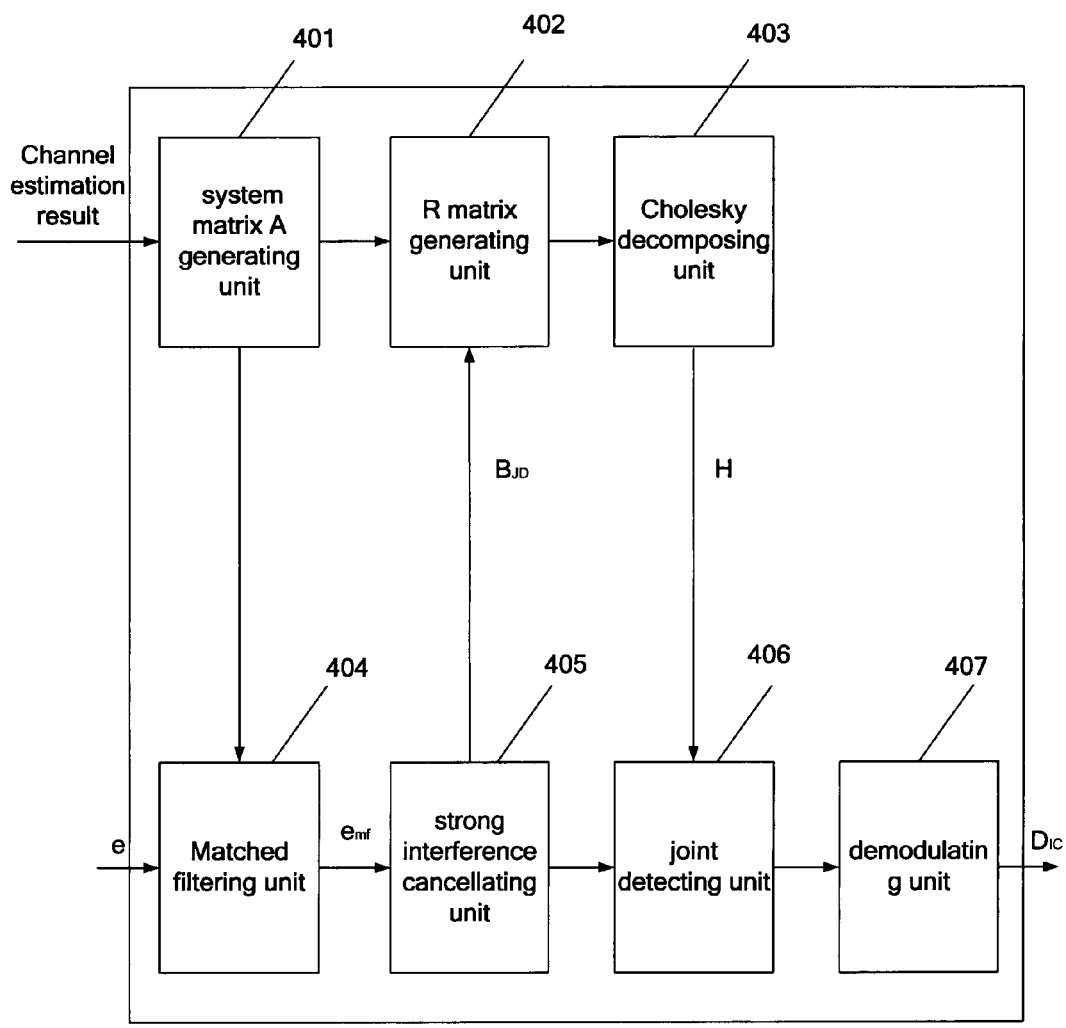
FIG. 4 shows a data flow of an interference cancellation according to an embodiment of the present invention.

Referring to FIG. 4, the interference cancellation method according to the embodiment of present invention is explained in detail as following.

system matrix A generating unit 401 constructing a system matrix A by utilizing channel estimation result, the system matrix A is:

$$A = \begin{bmatrix} B & & 0 \\ & B & \\ & & \ddots \\ 0 & & B \end{bmatrix}$$

where, the system submatrix B is shown as following:

$$B = \begin{bmatrix} b_1^{(1)} & b_1^{(2)} & \cdots & b_1^{(K)} \\ b_2^{(1)} & b_2^{(2)} & \cdots & b_2^{(K)} \\ \vdots & \vdots & \cdots & \vdots \\ b_Q^{(1)} & b_Q^{(2)} & \cdots & b_Q^{(K)} \\ b_{Q+1}^{(1)} & b_{Q+1}^{(2)} & \cdots & b_{Q+1}^{(K)} \\ \vdots & \vdots & \cdots & \vdots \\ b_{Q+W-1}^{(1)} & b_{Q+W-1}^{(2)} & \cdots & b_{Q+W-1}^{(K)} \end{bmatrix}$$

Wherein, the column vector $b^{(k)}$ corresponding to the kth active codes is shown as following:

$$b^{(k)} = [b_1^{(k)}, b_2^{(k)} \ldots b_{Q+W-1}^{(k)}]' = v^{(k)} * h^{(k)} \quad k=1, \ldots, K$$

where,
$v^{(k)}$ is a Point-wise multiply of a spreading code and a scrambling code;
$h^{(k)}$ is the channel estimation corresponding to the active spreading code;
K is the number of the active codes;
W is the length of a TD-SCDMA channel impulse response window; and
Q is a TD-SCDMA spreading factor.

matched filtering unit 404 matched filtering the received signal e based on the system matrix A to obtain a matched filtering result $e_{mf}$ of the received signal e;

strong interference cancelling unit 405 performing the following steps:

determining the strong interference codes based on the matched filtering result $e_{mf}$, after the strong interference codes is determined, selecting the column vectors corresponding to the strong interference code from the system submatrix B to compose the system submatrix $B_{SI}$ corresponding to the strong interference signal, and using the column vectors corresponding to the first active codes to compose the system submatrix $B_{JD}$ corresponding to the remaining signal (the useful signal and the weak interference signal).

After the system submatrix $B_{SI}$ is determined, constructing the system matrix $A_{SI}$ corresponding to the strong interference signal and the system matrix $A_{JD}$ corresponding to the remaining signal (the weak interference signal and the useful signal).

After the system matrix $A_{SI}$ is determined, calculating a matched filtering result of the strong interference signal, as following:

$$e_{mf,SI} = A_{SI}^H e$$

Recovering the following strong interference signal based on the matched filtering result of the strong interference signal:

$$\hat{e}_{mf,SI} = Q\{e_{mf,SI}\}$$

Where, $Q\{\cdot\}$ is a quantitative operation, which maps the matched filtering result of the symbol to modulated standard constellation points, for example, to standard constellation points of Quadrature Phase Shift Keying (QPSK).

When $A_{JD}$, $A_{SI}$ and e are determined, strong interference cancelling unit 405 may calculate the remaining signal using several methods.

In a first method, it is firstly to calculate $e - A_{SI}\hat{e}_{mf,SI}$, and then matched filter $e - A_{SI}\hat{e}_{mf,SI}$ with $A_{JD}$, so as to obtain the matched filtering result $e_{mf,JD}$ of the remaining signal:

$$e_{mf,JD} = A_{JD}^H [e - A_{SI}\hat{e}_{mf,SI}]$$

In a second method, it is to calculate $A_{JD}^H e$ and $[A_{JD}^H A_{SI}]\hat{e}_{mf,SI}$ respectively, and perform a subtraction on them to obtain the matched filtering result $e_{mf,JD}$ of the remaining signal:

$$e_{mf,JD} = e_{mf} - A_{JD}^H A_{SI}\hat{e}_{mf,SI}$$

On the other hand, R matrix generating unit 402 calculating a correlation matrix R ($A_{JD}^H A_{JD}$) of $A_{JD}$;

Cholesky decomposing unit 403 applying the Cholesky decomposition to the correlation matrix R to obtain a low-triangular matrix H.

Joint detecting unit 406 performing a joint detection based on the matched filtering result $e_{mf,JD}$ of the remaining signal and the matrix H to obtain a joint detection result.

Demodulating unit 407 demodulating the joint detection result to obtain a demodulated result $D_{JC}$.

A linear Minimum Mean Square Error (MMSE) joint detection method is used in the embodiment of the present invention. The function is as following:

$$d_{JD}=(A_{JD}{}^H A_{JD}+\sigma^2 I)^{-1} e_{mf,JD}=(HH^H)^{-1} e_{mf,JD}$$

Where, $d_{JD}$ is the joint detection result, $A_{JD}$ is the system matrix, $\sigma^2$ is noise power estimation, I is a unit matrix, and $e_{mf,JD}$ is the matched filtering result of the receive signal. A linear Zero Forcing (ZF) algorithm may also be used for the joint detection. The function is as following:

$$d_{JD}=(A_{JD}{}^H A_{JD})^{-1} e_{mf,JD}=(HH^H)^{-1} e_{mf,JD}$$

Where, $d_{JD}$ is the joint detection result, $A_{JD}$ is the system matrix, and $e_{mf,JD}$ is the matched filtering result of the receive signal.

Of course, other linear or non-linear algorithms may be used for the joint detection.

In the embodiment, the interference cancellation is used to cancel the strong interference signal in the strongest interference cells. After the strong interference signal in the strongest interference cell has been cancelled, the strong interference signal in the second strongest interference cell can be cancelled. The process is the same as that of the cancellation of the strong interference signal in the strongest interference cell. That is, the strong interference signal may be iteratively cancelled in the embodiment of the present invention.

A process of calculating two remaining signals obtained by cancelling the two strongest interference signals will be explained as following.

Figure 5:
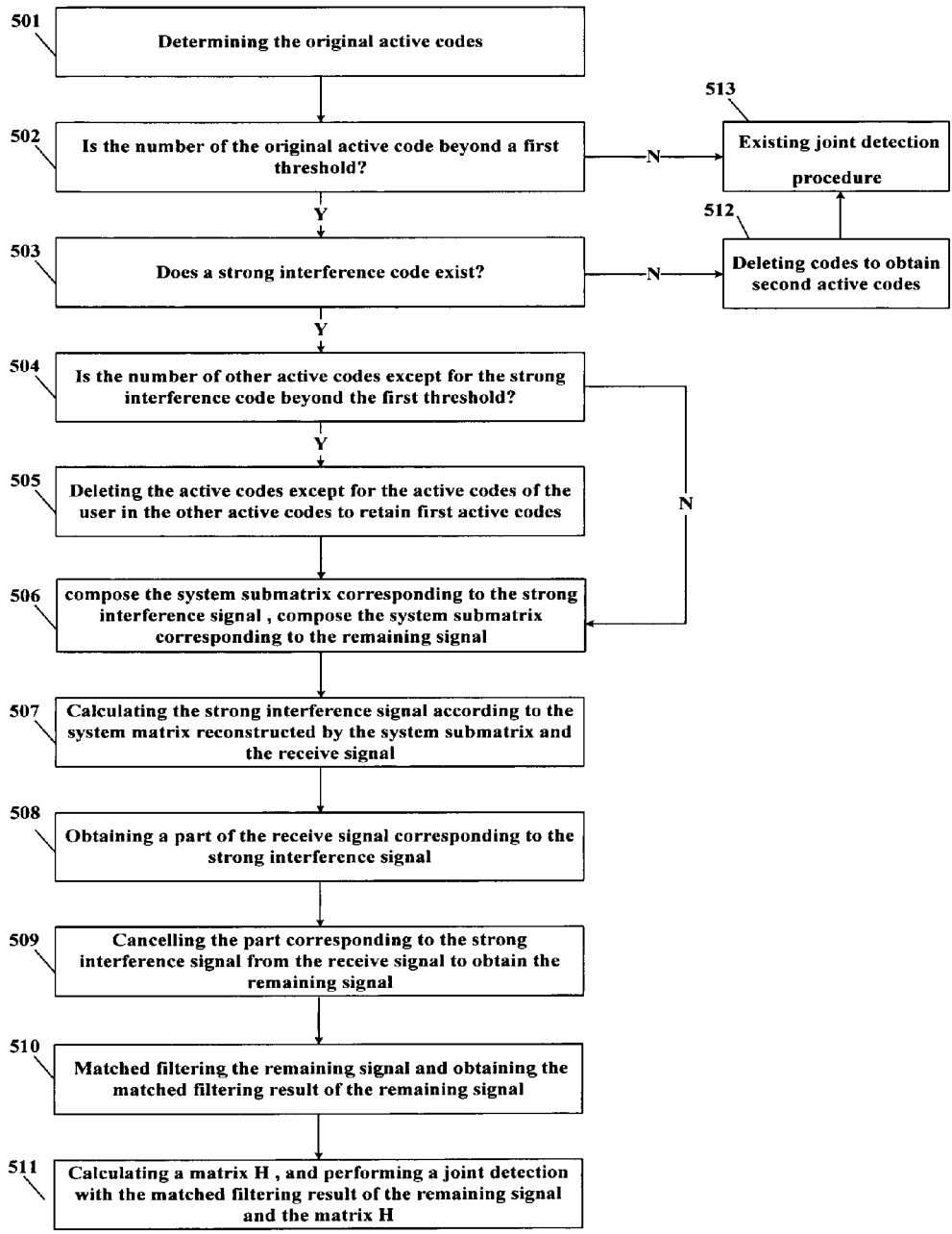
FIG. 5 shows a detail flow chart for calculating a matched filtering result of the remaining signal based on the determination of active codes according to an embodiment of the present invention.

As shown in FIG. 5, in the first method, the joint detection according to an embodiment of the present invention includes:

Step S501, determining the original active codes corresponding to a cell and the intra-frequency adjacent cells by utilizing information on the active windows of the cell and the intra-frequency adjacent cells in the channel estimation;

Step S502, determining whether the number of the original active codes is beyond a first threshold or not; if yes, the first method proceeds to step S503, otherwise the process proceeds to step S513;

Step S503, determining a ratio of power of the active codes corresponding to the intra-frequency adjacent cells to power of the active codes of the user is beyond a second threshold or not; if yes, it means that a strong interference codes exists in the active codes corresponding to the intra-frequency adjacent cells and then the first method proceeds to step S504, otherwise the process proceeds to step S512;

Step S504, determining whether the number of other active codes except for the strong interference codes in the original active codes is beyond the first threshold or not, if yes, the first method proceeds to step S505, otherwise the other active codes is regarded as the first active codes and the first method proceeds to step S506;

Step S505, sequencing the power of the other active codes, deleting the active codes except for the active codes of the user in the other active codes in the order from low power to high power to retain the first active codes, the number of which equals the first threshold;

Step S506, determining serial numbers of the strong interference codes and the first active codes, selecting column vectors corresponding to the strong interference codes to compose the system submatrix $B_{SI}$ corresponding to the strong interference signal from the system submatrix B (corresponding to the received signal e) generated from the channel estimation result, column vectors corresponding to the first active codes compose the system submatrix $B_{JD}$ corresponding to the remaining signal (the useful signal and the weak interference signal);

Step S507, calculating the strong interference signal $\hat{e}_{mf,SI}=Q\{A_{SI}{}^H e\}$ according to the system matrix $A_{SI}$ reconstructed by the system submatrix $B_{SI}$ and the received signal e, wherein Q is a quantitative operation, which maps the matched filtering result $A_{SI}{}^H e$ to modulated standard constellation points, such as the standard constellation points of QPSK; $A_{SI}{}^H e$ may be obtained by selecting from the matched filtering result of the received signal e according to the determination result of the strong interference codes;

Step S508, obtaining a part of the received signal $A_{SI}\hat{e}_{mf,SI}$ corresponding to the strong interference signal;

Step S509, cancelling the part $A_{SI}\hat{e}_{mf,SI}$ from the received signal to obtain the remaining signal $e-A_{SI}\hat{e}_{mf,SI}$;

Step S510, matched filtering the remaining signal $e-A_{SI}\hat{e}_{mf,SI}$ and obtaining the matched filtering result of the remaining signal $A_{JD}{}^H[e-A_{SI}\hat{e}_{mf,SI}]$;

Step S511, calculating a matrix H used for the joint detection based on the system matrix $A_{JD}$ corresponding to the remaining signal, and performing the joint detection with $A_{JD}{}^H[e-A_{SI}\hat{e}_{mf,SI}]$ and the matrix H to obtain a joint detection result; and Step S512, sequencing the power of the original active codes, deleting the active codes except for the active codes of the user in the original active codes in the order from low power to high power to obtain second active codes, the number of which is equal to the first threshold, then entering the existing joint detection procedure.

Step S513, the existing joint detection procedure.

In the embodiment of the present invention, there is no limit to the joint detection algorithm.

Figure 6:
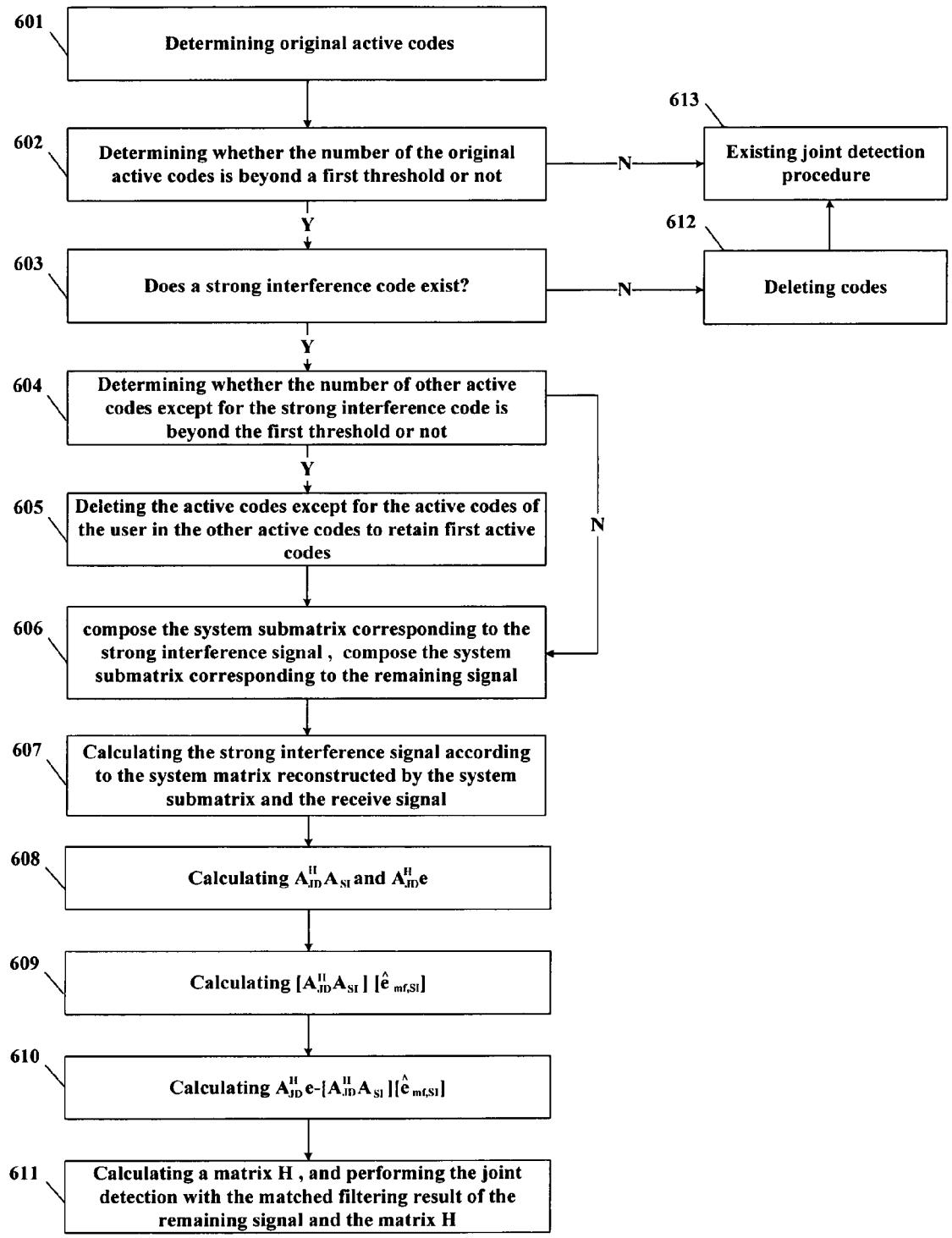
FIG. 6 shows another detail flow chart for calculating another matched filtering result of the remaining signal based on the determination of the active codes according to an embodiment of the present invention.

As shown in FIG. 6, in the second method, the joint detection method according to an embodiment of the present invention includes:

Step S601, determining the original active codes corresponding to a cell and the intra-frequency adjacent cells by utilizing information on the active windows of the cell and the intra-frequency adjacent cells in the channel estimation;

Step S602, determining whether the number of the original active codes is beyond a first threshold or not; if yes, the process proceeds to step S603, otherwise the process proceeds to step S613;

Step S603, determining a ratio of power of the active codes corresponding to the intra-frequency adjacent cells to power of the active codes of the user is beyond a second threshold or not; if yes, it means that a strong interference codes exists in the active codes corresponding to the intra-frequency adjacent cells and then the first method proceeds to step S604, otherwise the process proceeds to step S612;

Step S604, determining whether the number of other active codes except for the strong interference codes in the original active codes is beyond the first threshold or not, if yes, the first method proceeds to step S605, otherwise the other active codes is regarded as the first active codes and the first method proceeds to step S606;

Step S605, sequencing the power of the other active codes, deleting the active codes except for the active codes of the user in the other active codes in the order from low power to high power to retain the first active codes, the number of which equals the first threshold;

Step S606, determining serial numbers of the strong interference codes and the first active codes, selecting column vectors corresponding to the strong interference codes to compose the system submatrix $B_{SI}$ corresponding to the strong interference signal from the system submatrix B (corresponding to the received signal e) generated from the channel estimation result, column vectors corresponding to the first active codes compose the system submatrix $B_{JD}$ corresponding to the remaining signal (the useful signal and the weak interference signal);

Step S607, calculating the strong interference signal $\hat{e}_{mf,\,SI} = Q\{A_{SI}^H e\}$ according to the system matrix $A_{SI}$ reconstructed by the system submatrix $B_{SI}$ and the received signal e, wherein Q is a quantitative operation, which maps the matched filtering result $A_{SI}^H e$ to modulated standard constellation points, such as the standard constellation points of QPSK; $A_{SI}^H e$ may be obtained by selecting from the matched filtering result of the received signal e according to the determination result of the strong interference codes;

Step S608, calculating a correlation matrix $A_{JD}^H A_{SI}$ and $A_{JD}^H e$, wherein $A_{JD}^H e$ may be obtained by a direct calculation or by deleting the matched filtering result corresponding to the strong interference signal from the matched filtering result of the received signal e;

Step S609, matrix multiplying the correlation matrix $A_{JD}^H A_{SI}$ and the reconstructed strong interference signal $\hat{e}_{mf,\,SI}$, to obtain $[A_{JD}^H A_{SI}][\hat{e}_{mf,\,SI}]$;

Step S610, calculating $A_{JD}^H e - [A_{JD}^H A_{SI}][\hat{e}_{mf,\,SI}]$;

Step S611, calculating a matrix H used for the joint detection based on the system matrix $A_{JD}$ corresponding to the remaining signal, and performing the joint detection with $A_{JD}^H[e - A_{SI}\hat{e}_{mf,\,SI}]$ and the matrix H to obtain a joint detection result;

Step S612, sequencing the power of the original active codes, deleting the active codes except for the active codes of the user in the original active codes in the order from low power to high power to obtain second active codes, the number of which is equal to the first threshold, then the process proceeds to the existing joint detection procedure;

Step S613, the existing joint detection procedure.

In the embodiment of the present invention, there is no limit to the joint detection algorithm.

In the above embodiment, after the matched filtering, it is determined whether the number of the original active codes corresponding to the cell and the intra-frequency adjacent cells is beyond a predefined threshold or not, so as to select the existing joint detection procedure or the interference cancellation procedure. In an embodiment of the present invention, after the channel estimation, it is determined whether the number of the active windows corresponding to the cell and the intra-frequency adjacent cells is beyond a predefined threshold or not, so as to select the existing joint detection procedure or the interference cancellation procedure.

Figure 7:
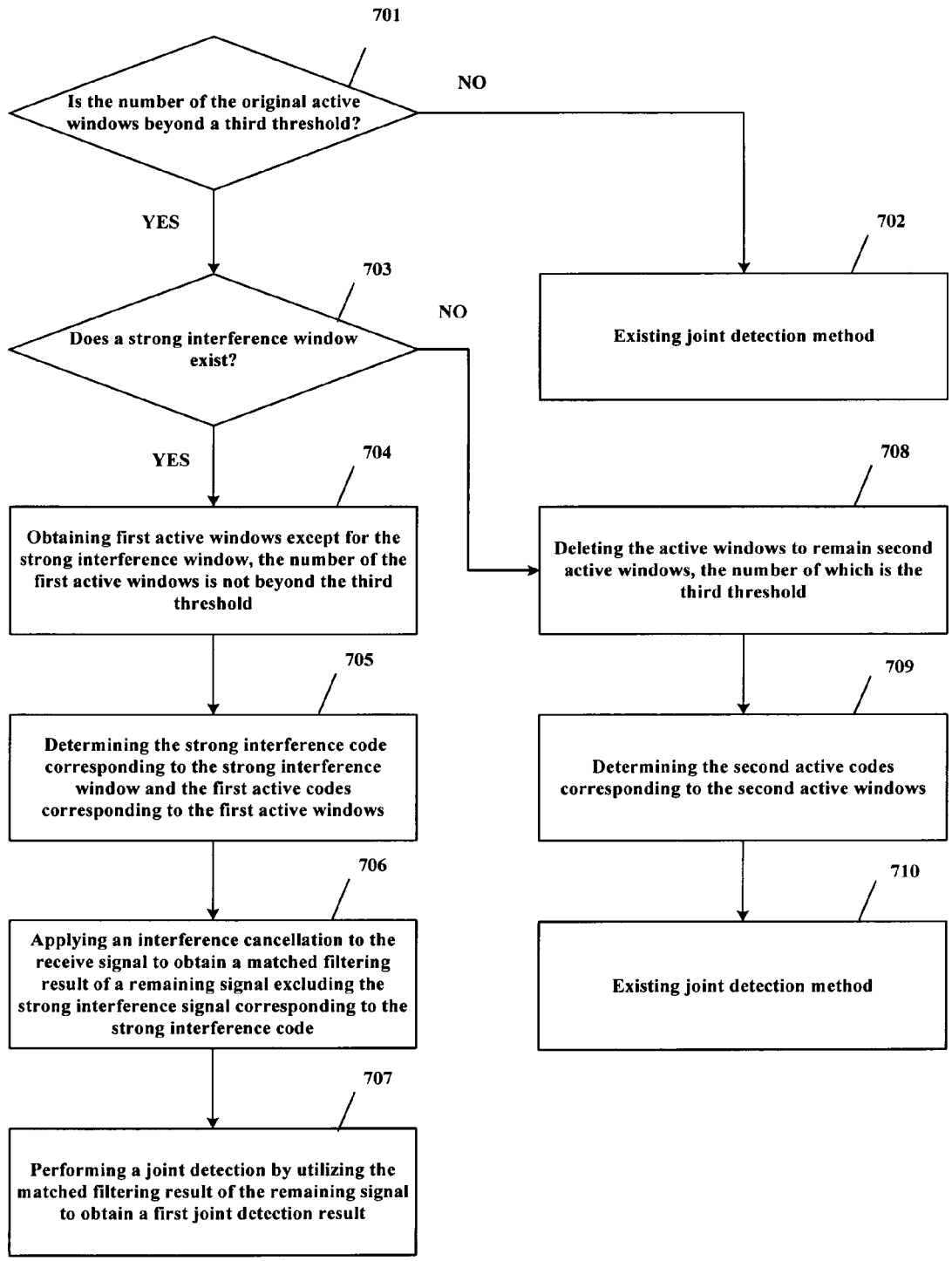
FIG. 7 shows another schematic flow chart of the joint detection method according to an embodiment of the present invention.
Figure 8:
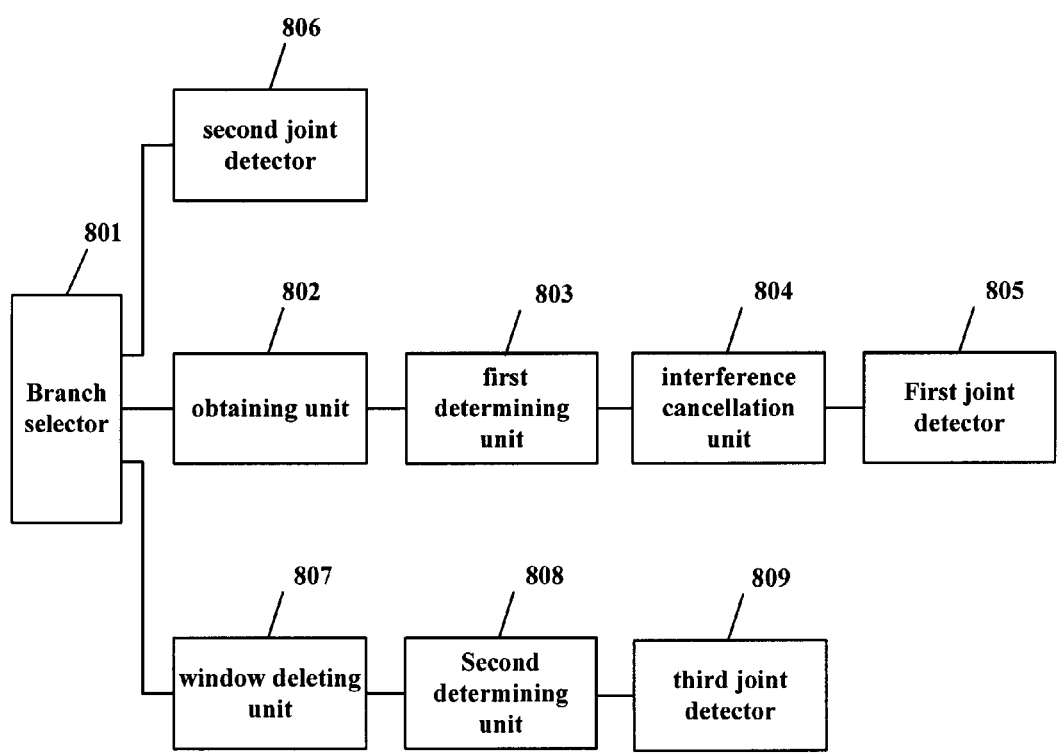
FIG. 8 shows another schematic diagram of the configuration of the joint detection device according to an embodiment of the present invention.

FIG. 7 shows another schematic flow chart of the joint detection method according to an embodiment of the present invention. The join detection method includes the following steps:

Step S701, determining a number of the original active windows corresponding to a cell and intra-frequency adjacent cells is beyond a third threshold or not, if the number of the original active codes is not beyond the third threshold, the process proceeds to Step S702, otherwise, the process proceeds to Step S703, wherein, the cell is a service cell where a user equipment (UE) is located, the maximum number of the active codes which can be processed by a joint detection is commonly 16 and one active window commonly includes one or two active codes, therefore, in the embodiment of the present invention, the third threshold may be set to 8;

Step S702, performing a joint detection by utilizing the original active windows and a matched filtering result of a received signal so as to obtain a second joint detection result, that is, when the number of the original active windows is not beyond the third threshold, the process proceeds to the existing joint detection procedure;

Step S703, determining whether a strong interference window exists in the active windows corresponding to the intra-frequency adjacent cells or not, wherein a ratio of power of the strong interference window and power of the active window of the user is beyond a fourth threshold, and when a strong interference window exists in the active windows corresponding to the intra-frequency adjacent cells, the process proceeds to Step S704, otherwise the process proceeds to step S707, wherein the fourth threshold can be set as required;

Step S704, obtaining a first active windows except for the strong interference window from the original active windows, the number of the first active windows is not beyond the third threshold;

Step S705, determining the strong interference codes corresponding to the strong interference window and the first active codes corresponding to the first active windows;

Step S706, applying an interference cancellation to the received signal to obtain a matched filtering result of a remaining signal excluding the strong interference signal corresponding to the strong interference code;

Step S707, performing a joint detection by utilizing the first active codes and the matched filtering result of the remaining signal to obtaining a first joint detection result;

Step S708, sequencing power of the original active windows, deleting the active windows except for the active windows of the user in the original active windows in the order from low power to high power to remain a second active windows, the number of which is the third threshold;

Step S709, determining second active codes corresponding to the second active windows; and Step S710, performing a joint detection by utilizing the second active codes and the matched filtering result of the receiving signal to obtain a third joint detection result. FIG. 8 shows a detail diagram of a configuration of a joint detection apparatus according to an embodiment of the present invention. The joint detection apparatus includes:

a branch selector 801, configured determined if a number of original active windows corresponding to a cell and the intra-frequency adjacent cells is beyond a third threshold or not;

an obtaining unit 802, configured to, when the number of the original active windows is beyond the third threshold and one or more strong interference windows exit among active windows corresponding to the intra-frequency adjacent cells, obtain a first active windows except for the strong interference window in the original active windows, wherein, the number of the first active windows is not beyond the third threshold, and wherein a ratio of power of each of the one or more strong interference window to a power of active windows of the user is beyond a fourth threshold;

a first determining unit 803, configured determined if strong interference codes corresponding to the strong interference window and first active codes corresponding to the first active windows;

an interference cancellation unit 804, configured to apply an interference cancellation to a received signal to obtain a matched filtering result of a remaining signal excluding the strong interference signal corresponding to the strong interference codes;

a first joint detector 805, configured to perform a joint detection by utilizing the first active codes and the matched filtering result of the remaining signal to obtain a first joint detection result;

a second joint detector 806, configured to, when the number of the original active windows is not beyond the third threshold, perform a joint detection by utilizing the active codes corresponding to the active windows and the matched filtering result of the received signal to obtain a second joint detection result;

a window deleting unit 807, configured to, when the number of the original active windows is beyond the third threshold and a strong interference window does not exist in the active windows corresponding to the intra-frequency adjacent cells, sequence power of the original active windows and delete the active windows except for the active window of the user in the original active windows in the order from highest power to the lowest power to retain a second active windows, the number of which is the third threshold;

a second determining unit 808, configured determined if second active codes corresponding to the second active windows; and a third joint detector 809, configured to perform a joint detection by utilizing the second active codes and the matched filtering result of the received signal to obtain a third joint detection result.

Furthermore, an embodiment of the present invention relates to a receiver including the above joint detection apparatus.

The joint detection method and apparatus has the following beneficial effects.

When the number of the active windows used for the joint detection is not beyond a predefined threshold, the existing joint detection method is used. The existing joint detection method considers all users' signals in the cell and the intra-frequency adjacent cells so that the accuracy of the joint detection may be guaranteed.

When the number of the active windows used for the joint detection is beyond the predefined threshold, the strong interference signal is cancelled from the receive signal. Since data used for the joint detection has no data corresponding to the strong interference signal, the joint detection result is more accurate. Furthermore, the tolerance of codes demodulated by the joint detection increases (from 16 to 16+N, N is the number of the strong interference codes).

When the number of active windows used for the joint detection is not beyond the predefined threshold, the process of the joint detection according to the embodiment of the present invention is as following:

Constructing a system matrix A by utilizing channel estimation result to obtaining R ($A^H A$) which is a correlation matrix of the system matrix A, and applying the Cholesky decomposition to the correlation matrix R to obtain a matrix H;

Matched filtering the received signal e based on the system matrix A to obtain a matched filtering result $e_{mf}$ of the received signal e; and Performing a joint detection based on the matched filtering result of the received signal $e_{mf}$ and the matrix H to obtaining a joint detection result.

Furthermore, the joint detection result is demodulated to obtain a demodulated result $d_{JD}$.

A linear Minimum Mean Square Error (MMSE) joint detection method is used in an embodiment of the present invention. The function is as following:

$$d_{JD}=(A^H A+\sigma^2 I)^{-1}e_{mf}=(HH^H)^{-1}e_{mf}$$

Where, $d_{JD}$ is the joint detection result. A is the system matrix, $\sigma^2$ is noise power estimation, I is a unit matrix, and $e_{mf}$ is the matched filtering result of the receive signal.

A linear Zero Forcing (ZF) algorithm may also be used for the joint detection. The function is as following:

$$d_{JD}=(A^H A)^{-1}e_{mf}=(HH^H)^{-1}e_{mf}$$

Where, $d_{JD}$ is the joint detection result. A is the system matrix, and $e_{mf}$ is the matched filtering result of the receive signal.

Of course, other linear or non-linear algorithms may be used for the joint detection.

In the above embodiments, the power of the active windows of the user is used determined if the strong interference window. In an embodiment of the present invention, the power of the active windows of the user may be:

average power of all active windows of the user;

the maximum power of all active windows of the user; or power of any one of the active windows of the user.

Taking the maximum power of all active windows of the user as an example of the power of active windows, a method of determining a strong interference window according to an embodiment of the present invention is explained in detail.

The strong interference window may be determined based on the following method:

Step 1, obtaining the maximum power $P_{win\_max}$ of all active windows of the user;

Step 2, calculating a ratio of the power of the active windows corresponding to the intra-frequency adjacent cells to the maximum power $P_{win\_max}$;

Step 3, taking the active window with a ratio larger than the fourth threshold as the strong interference window.

During the strong interference cancellation, the strong interference signal is firstly demodulated. In an embodiment of the present invention, there are various methods determined if whether the strong interference signal may be demodulated or not. That is determined if whether the strong interference window determined above is a real strong interference window. A method employing power of cell determined if is explained here.

When a cell has strong power and other cells have weak power, MAI of other cells to the cell may be ignored. The strong interference codes in the cell may be accurately determined after a matched filtering. Based on the above concept, in an embodiment of the present invention, a ratio of average power of a first cell on which the determined strong interference window is located to average power of first adjacent cell is directly used determined if whether the strong interference signal may be demodulated or not. When the ratio of the power of the first cell to the power of its adjacent cells is larger than a predefined threshold, it is determined that the strong interference signal can be demodulated, the first cell is determined as the strong interference cell, and the active window corresponding to the first cell is the strong interference window. Otherwise it is determined that the strong interference signal cannot be demodulated, the first cell is not determined as the strong interference cell, and the active window corresponding to the first cell is not the strong interference window. In an embodiment of the present invention, the active window in the cell and the intra-frequency adjacent cell may be determined by the following method:

Step 1, obtaining the maximum power $P_{win\_max}$ of the active windows of the user;

Step 2, calculating a ratio of the power of the user window corresponding to the cell and the intra-frequency adjacent cells to the maximum power $P_{win\_max}$;

$$r_{userP}^{(k_{mn})} = \frac{p_h^{(k_{mn})}}{p_{win\_max}} \quad (k_{mn} = 0, \ldots, K_{mn} - 1)$$

where, $r_{userP}^{(k_{mn})}$ is the ratio of the power of the user window corresponding to the cell and the intra-frequency adjacent cells to the maximum power p of the user, $p_h^{(k_{mn})}$ is the power of user window corresponding to the cell and the intra-frequency adjacent cells, $p_{win\_max}$ is the maximum power of all active windows of the user, and $k_{mn}$ is a serial number of the user window corresponding to the cell or the intra-frequency adjacent cells; and Step 3, taking the user window with a ratio larger than a predefined threshold as the active window.

In an embodiment of the present invention, after the strong interference window is determined, it is determined whether the number of other active windows except for the strong interference window in the active windows corresponding to the cell and the intra-frequency adjacent cells is beyond a third threshold or not. When the number of other active windows is beyond the third threshold, the other active windows are deleted to obtain first active windows, wherein the number of the first active windows is equal to the third threshold. When the number of other active windows is not beyond the third threshold, the other active windows are directly used as the first active windows.

In the embodiment of the present invention, during the deleting, power of other active windows excluding the strong interference window is firstly obtained and sequenced, and the active windows except for the active windows of the user in the other active windows are deleted in the order from low power to high power, so that the first active windows, the number of which is the third threshold, are remained.

Furthermore, in the embodiments, when the number of the original active windows corresponding to the cell and the intra-frequency adjacent cells is beyond the third threshold and a strong interference window does not exist in the original active windows, the power of the original active windows are firstly obtained and sequenced. The active windows except for the active windows of the user in the original active windows are deleted in the order from low power to high power, so that second active windows, the number of which is the third threshold, are obtained.

In the embodiment, after determining the strong interference window, the strong interference code corresponding to the strong interference window are determined, and then the strong interference signal corresponding to the strong interference code is determined. The interference cancellation is applied to the received signal and the remaining signal excluding the strong interference signal is obtained.

The interference cancellation method according to the embodiment of the present invention is an interference cancellation technique based on interference reconstruction/subtraction. In this technique, the strong interference signal transmitted by the intra-frequency adjacent cells is reconstructed and subtracted from the receive signal.

The interference cancellation method according to the embodiment of present invention is explained in detail as following.

After the channel estimation, the system matrix A can be constructed based on information on the active windows:

$$A = \begin{bmatrix} B & & 0 \\ & B & \\ 0 & & B \end{bmatrix}$$

where, the system submatrix B is shown as following:

$$B = \begin{bmatrix} b_1^{(1)} & b_1^{(2)} & \ldots & b_1^{(K)} \\ b_2^{(1)} & b_2^{(2)} & \ldots & b_2^{(K)} \\ \vdots & \vdots & \ldots & \vdots \\ b_Q^{(1)} & b_Q^{(2)} & \ldots & b_Q^{(K)} \\ b_{Q+1}^{(1)} & b_{Q+1}^{(2)} & \ldots & b_{Q+1}^{(K)} \\ \vdots & \vdots & \ldots & \vdots \\ b_{Q+W-1}^{(1)} & b_{Q+W-1}^{(2)} & \ldots & b_{Q+W-1}^{(K)} \end{bmatrix}$$

wherein, the column vector $b^{(k)}$ corresponding to the kth active codes is shown as following:

$$b^{(k)} = [b_1^{(k)}, b_2^{(k)} \ldots b_{Q+W-1}^{(k)}]' = v^{(k)} * h^{(k)} \quad k=1, \ldots, K$$

where, $V^{(k)}$ is a Point-wise multiply of a spreading code and a scrambling code;

$h^{(k)}$ is the channel estimation corresponding to the active spreading code;

K is the number of the active codes;

W is the length of a TD-SCDMA channel impulse response window; and

Q is a TD-SCDMA spreading factor.

After the strong interference codes is determined, the column vectors corresponding to the strong interference code are selected from the system submatrix B to compose the system submatrix $B_{SI}$ corresponding to the strong interference signal. The column vectors corresponding to the first active codes can compose the system submatrix $B_{JD}$ corresponding to the remaining signal (the useful signal and the weak interference signal).

After the system submatrix $B_{SI}$ is determined, the system matrix $A_{SI}$ corresponding to the strong interference signal and the system matrix $A_{JD}$ corresponding to the remaining signal (the weak interference signal and the useful signal) may be constructed.

After the system matrix $A_{SI}$ is determined, a matched filtering result of the strong interference signal is calculated as following:

$$e_{mf,SI} = A_{SI}^H e$$

The following strong interference signal can be recovered based on the matched filtering result of the strong interference signal:

$$\hat{e}_{mf,SI} = Q\{e_{mf,SI}\}$$

where, $Q\{\bullet\}$ is a quantitative operation, which maps the matched filtering result of the symbol to modulated standard constellation points, for example, to standard constellation points of Quadrature Phase Shift Keying (QPSK).

When $A_{JD}$, $A_{SI}$ and e are determined, several methods may be used to calculate the remaining signal.

In a first method, it is firstly to calculate $e - A_{SI}\hat{e}_{mf,SI}$, and then matched filter $e - A_{SI}\hat{e}_{mf,SI}$ with $A_{JD}$, so as to obtain the matched filtering result $e_{mf,JD}$ of the remaining signal:

$$e_{mf,JD} = A_{JD}^H [e - A_{SI}\hat{e}_{mf,SI}]$$

In a second method, it is to calculate $A_{JD}^H e$ and $[A_{JD}^H A_{SI}]$ $\hat{e}_{mf, SI}$ respectively, and perform a subtraction on them to obtain the matched filtering result $e_{mf, JD}$ of the remaining signal:

$$e_{mf,JD} = e_{mf} - A_{JD}^H A_{SI} \hat{e}_{mf,SI}$$

On the other hand, it is to obtain a correlation matrix R $(A_{JD}^H A_{JD})$ of $A_{JD}$, and apply the Cholesky decomposition to the correlation matrix to obtain a matrix H.

Finally, it is to perform a joint detection based on the matched filtering result $e_{mf, JD}$ of the remaining signal and the matrix H to obtain a joint detection result.

Furthermore, the joint detection result is demodulated to obtain a demodulated result $d_{JD}$.

A linear Minimum Mean Square Error (MMSE) joint detection method is used in the embodiment of the present invention. The function is as following:

$$d_{JD} = (A_{JD}^H A_{JD} + \sigma^2 I)^{-1} e_{mf,JD} = (HH^H)^{-1} e_{mf,JD}$$

where, $d_{JD}$ is the joint detection result, A is the system matrix, $\sigma^2$ is noise power estimation, I is a unit matrix, and $e_{mf,JD}$ is the matched filtering result of the receive signal.

A linear Zero Forcing (ZF) algorithm may also be used for joint detection. The function is as following:

$$d_{JD} = (A_{JD}^H A_{JD})^{-1} e_{mf,JD} = (HH^H)^{-1} e_{mf,JD}$$

where, $d_{JD}$ is the joint detection result, $A_{JD}$ is the system matrix, and $e_{mf, JD}$ is the matched filtering result of the receive signal.

Of course, other linear or non-linear algorithms may be used for the joint detection.

In the embodiment, the interference cancellation is used to cancel the strong interference signal in the strongest interference cells. After the strong interference signal in the strongest interference cell has been cancelled, the strong interference signal in the second strongest interference cell can be cancelled. The process is the same as that of the cancellation of the strong interference signal in the strongest interference cell. That is, the strong interference signal may be iteratively cancelled in the embodiment of the present invention.

A process of calculating two remaining signals obtained by cancelling the two strongest interference signals will be explained as following.

Figure 9:
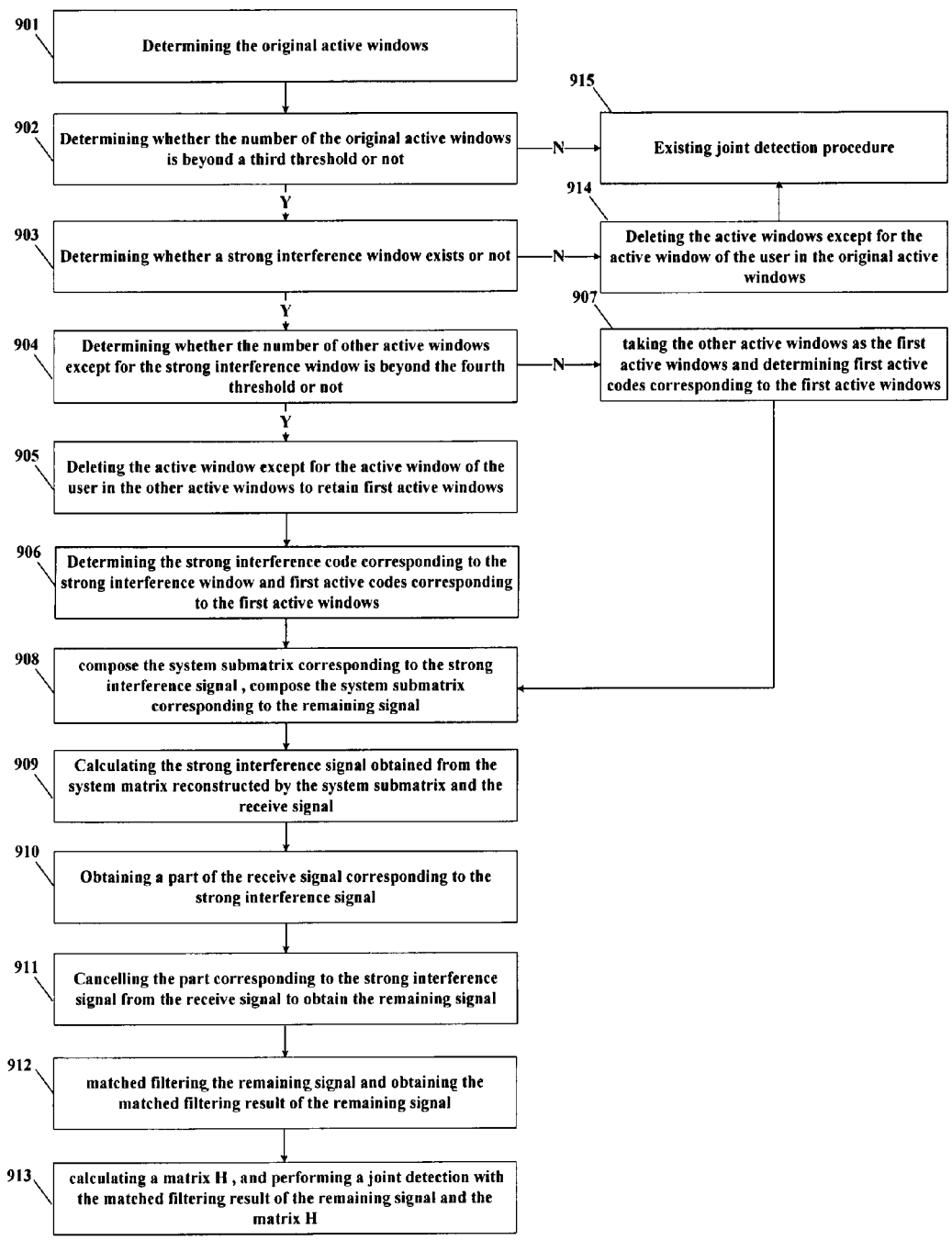
FIG. 9 shows a detail flow chart for calculating a matched filtering result of the remaining signal based on the determination of active windows according to an embodiment of the present invention.

As shown in FIG. 9, in the first method, the joint detection according to an embodiment of the present invention includes:

Step S901, determining the original active windows corresponding to a cell and the intra-frequency adjacent cells by utilizing a channel estimation result;

Step S902, determining whether the number of the original active windows is beyond a third threshold or not; if yes, the first method proceeds to step S903, otherwise the process proceeds to step S915; Step S903, determining a ratio of power of the active window corresponding to the intra-frequency adjacent cell to the power of the active window of the user is beyond a fourth threshold or not; if yes, it means that a strong interference window exists in the active windows corresponding to the intra-frequency adjacent cells and then the first method proceeds to entering step S904, otherwise the process proceeds to step S914;

Step S904, determining whether the number of other active windows except for the strong interference window in the original active windows is beyond the fourth threshold or not, if yes, the first method proceeds to step S905, otherwise the first method proceeds to step S907;

Step S905, sequencing the power of the other active windows, deleting the active window except for the active window of the user in the other active windows in the order from low power to high power to retain the first active windows, the number of which is the third threshold;

Step S906, determining the strong interference codes corresponding to the strong interference window and first active codes corresponding to the first active windows;

Step S907, taking the other active windows as the first active windows and determining first active codes corresponding to the first active windows;

Step S908, based on serial numbers of the strong interference codes and the first active codes, selecting column vectors corresponding to the strong interference codes to compose the system submatrix $B_{SI}$ corresponding to the strong interference signal from the system submatrix B (corresponding to the received signal e) generated from the channel estimation result, column vectors corresponding to the first active codes compose the system submatrix $B_{JD}$ corresponding to the remaining signal (the useful signal and the weak interference signal);

Step S909, calculating the strong interference signal $\hat{e}_{mf, SI} = Q\{A_{SI}^H e\}$ according to the system matrix $A_{SI}$ reconstructed by the system submatrix $B_{SI}$ and the received signal e, wherein Q is a quantitative operation, which maps the matched filtering result $A_{SI}^H e$ to modulated standard constellation points, such as the standard constellation points of QPSK; $A_{SI}^H e$ may be obtained by selecting from the matched filtering result of the received signal e according to the determination result of the strong interference codes;

Step S910, obtaining a part of the received signal $A_{SI} \hat{e}_{mf, SI}$ corresponding to the strong interference signal;

Step S911, cancelling the part $A_{SI} \hat{e}_{mf, SI}$ from the received signal to obtain the remaining signal $e - A_{SI} \hat{e}_{mf, SI}$;

Step S912, matched filtering the remaining signal $e - A_{SI} \hat{e}_{mf, SI}$ and obtaining the matched filtering result of the remaining signal $A_{JD}^H [e - A_{SI} \hat{e}_{mf, SI}]$;

Step S913, calculating a matrix H used for the joint detection based on the system matrix $A_{JD}$ corresponding to the remaining signal, and performing the joint detection with $A_{JD}^H [e - A_{SI} \hat{e}_{mf, SI}]$ and the matrix H to obtain a joint detection result; and Step S914, sequencing the power of the original active windows, deleting the active window except for the active window of the user in the original active windows in the order from low power to high power to obtain second active windows, the number of which is equal to the third threshold, and then entering the existing joint detection procedure;

Step S915, the existing joint detection procedure.

In the embodiment of the present invention, there is no limit to the joint detection algorithm.

Figure 10:
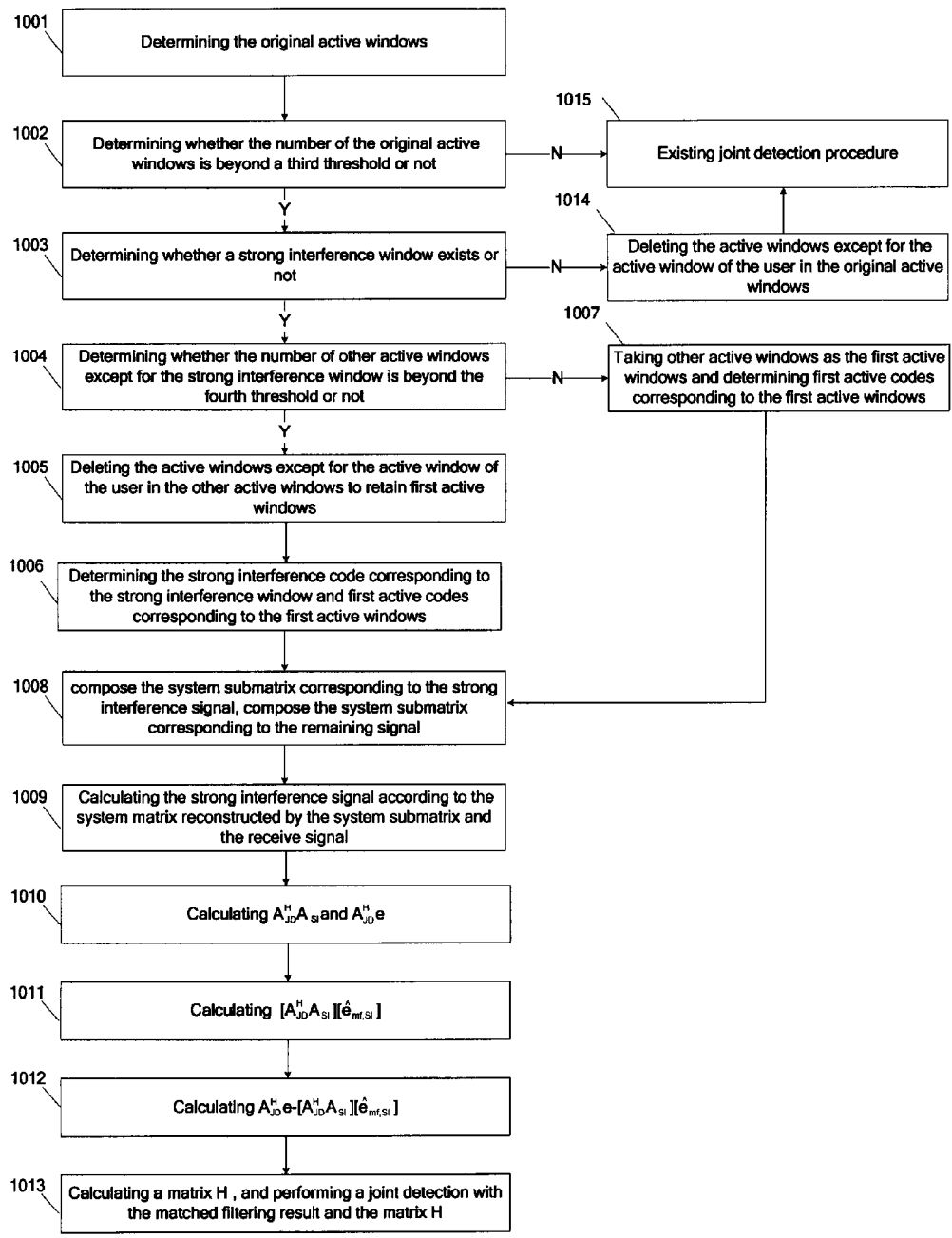
FIG. 10 shows another detail flow chart for calculating the matched filtering result of the remaining signal based on the determination of the active windows according to an embodiment of the present invention.

As shown in FIG. 10, in the second method, the joint detection method according to an embodiment of the present invention includes:

Step S1001, determining the original active windows corresponding to a cell and the intra-frequency adjacent cells by utilizing a channel estimation result;

Step S1002, determining whether the number of the original active windows is beyond a third threshold or not; if yes, entering step S1003, otherwise entering step S1015; Step S1003, determining a ratio of power of the active window corresponding to the intra-frequency adjacent cell to power of the active window of the user is beyond a fourth threshold or not; if yes, it means that a strong interference window exists in the active window corresponding to the intra-frequency adjacent cell, the second method proceeds to step S1004, otherwise the second method proceeds to step S1014;

Step S1004, determining whether the number of other active windows except for the strong interference window in the original active windows is beyond the fourth threshold or not, if yes, the second method proceeds to step S1005, otherwise the second method proceeds to step S1007;

Step S1005, sequencing the power of the other active windows, deleting the active windows except for the active windows of the user in the other active windows in the order from low power to high power to retain a first active windows, the number of which is the third threshold;

Step S1006, determining the strong interference codes corresponding to the strong interference windows and first active codes corresponding to the first active windows;

Step S1007, taking the other active windows as the first active windows and determining the first active codes corresponding to the first active windows;

Step S1008, based on serial numbers of the strong interference codes and the first active codes, selecting column vectors corresponding to the strong interference codes to compose the system submatrix $B_{SI}$ corresponding to the strong interference signal from the system submatrix B (corresponding to the received signal e) generated from the channel estimation result, column vectors corresponding to the first active codes composes the system submatrix $B_{JD}$ corresponding to the remaining signal (the useful signal and the weak interference signal);

Step S1009, calculating the strong interference signal $\hat{e}_{mf,SI}=Q\{A_{SI}^H e\}$ according to the system matrix $A_{SI}$ reconstructed by the system submatrix $B_{SI}$ and the received signal e, wherein Q is a quantitative operation, which maps the matched filtering result $A_{SI}^H e$ to modulated standard constellation points, such as the standard constellation points of QPSK; $A_{SI}^H e$ may be obtained by selecting from the matched filtering result of the received signal e according to the determination result of the strong interference codes;

Step S1010, calculating a correlation matrix $A_{JD}^H A_{SI}$ and $A_{JD}^H e$, wherein $A_{JD}^H e$ may be obtained by a direct calculation or by deleting the matched filtering result corresponding to the strong interference signal from the matched filtering result of the received signal e;

Step S1011, matrix multiplying the correlation matrix $A_{JD}^H A_{SI}$ and the reconstructed strong interference signal $\hat{e}_{mf,SI}$, to obtain $[A_{JD}^H A_{SI}][\hat{e}_{mf,SI}]$;

Step S1012, calculating $A_{JD}^H e - [A_{JD}^H A_{SI}][\hat{e}_{mf,SI}]$;

Step S1013, calculating a matrix H used for the joint detection based on the system matrix $A_{JD}$ corresponding to the remaining signal, and performing the joint detection with $A_{JD} H[e-A_{SI}\hat{e}_{mf,SI}]$ and the matrix H to obtain a joint detection result;

Step S1014, sequencing the power of the original active windows, deleting the active window except for the active window of the user in the original active windows in the order from low power to high power to obtain second active windows, the number of which is equal to the third threshold, then the process proceeds to the existing joint detection procedure;

Step S1015, the existing joint detection procedure.

In the embodiment of the present invention, there is no limit to the joint detection algorithm.

The methods according to the embodiments of the present invention may be implemented by software and/or hardware. Therefore, a processor, such as a general processor or a signal processor, is suitable to be used to implement the joint detection according to the embodiments of the present invention. The processor can load and execute a computer program including program code stored in a computer readable medium to implement the above methods.

In order to verify the effect of the methods according to the embodiments of the present invention, when the number of the original active codes corresponding to the cell and the intra-frequency adjacent cells is beyond a predefined threshold, a simulation is implementing by using the joint detection method used for the strong interference cancellation according to the embodiment of the present invention and the existing joint detection method. The simulation configuration is as following:

TABLE 1

DCH simulation configurations (64 Kbps)

| Parameters | Unit | Parameter |
|---|---|---|
| Scrambling code and basic midamble code number of SS#1*, SS#2*, SS#3* | | 19, 58, 85 |
| DPCH Channelization Codes of SS#1* | C(k, Q) | C(i, 16) 1 ≤ i ≤ 8 |
| DPCH$_o$ Channelization Codes of SS#2* | C(k, Q) | C(i, 16) 1 ≤ i ≤ 6 |
| DPCH$_o$ Channelization Codes of SS#3* | C(k, Q) | C(i, 16) 1 ≤ i ≤ 6 |
| $\frac{DPCH_o\_Ec}{I_{oc}}$ of SS#2, SS#3 | dB | 10, 4 |
| $I_{oc}$ | dBm/1.28 MHz | −90 |
| Midamble | | Default midamble (Kcell = 8) |

*Note:
Refer to TS 25.223 for definition of channelization codes, scrambling code and basic midamble code.

Figure 11:
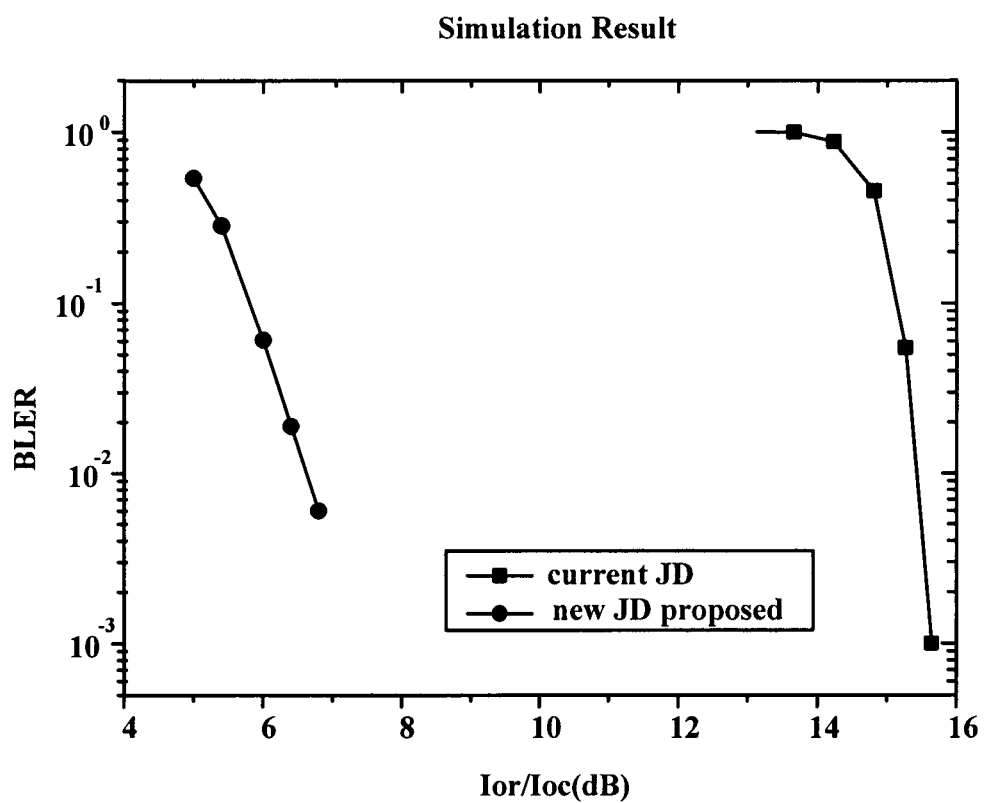
FIG. 11 is a diagram showing a simulation result of the method according to an embodiment of the present invention.

FIG. 11 is a schematics diagram showing a simulation result of the receiver under the simulation configuration. Compared with the existing method, the joint detection method used for the strong interference cancellation according to the embodiments of the present invention significantly improves the performance when the number of the original active codes corresponding to the cell and the intra-frequency adjacent cells is beyond a predefined threshold.

What is claimed is:

1. A joint detection method comprising:
   determining if a number of original active codes corresponding to a cell and intra-frequency adjacent cells exceeds a first threshold;
   if the number of the original active codes is beyond the first threshold and one or more strong interference codes exist among active codes corresponding to the intra-frequency adjacent cells, obtaining a number of first active codes of the original active codes excluding the one or more strong interference codes, wherein the number of the first active codes does not exceed the first threshold, and wherein a ratio of a power of each of the one or more strong interference codes to a power of an active code of a user exceeds a second threshold;
   applying, based on the one or more strong interference codes, an interference cancellation to a received signal to obtain a matched filtering result of a remaining signal excluding a strong interference signal corresponding to the one or more strong interference codes; and
   performing a joint detection by utilizing the first active codes and the matched filtering result of the remaining signal to obtain a first joint detection result.

2. The joint detection method of claim 1 further comprising:
   if the number of the original active codes does not exceed the first threshold, performing a joint detection by utilizing the original active codes and a matched filtering result of the received signal to obtain a second joint detection result.

3. The joint detection method of claim 1 further comprising:
   if the number of the original active codes exceeds the first threshold and a strong interference code does not exist among the active code corresponding to the intra-frequency adjacent cells, sequencing power of the original active codes and deleting active codes except for the active codes of the user in the original active codes in the order from low power to high power to retain a number of second active codes, the number of which equals the first threshold; and
   performing a joint detection by utilizing the second active codes and a matched filtering result of the received signal to obtain a third joint detection result.

4. The joint detection method of claim 1 wherein the obtaining comprising:
   determining whether the number of other active codes except for the strong interference code in the original active codes exceeds the first threshold;
   sequencing power of the other active codes and deleting the active codes except for the active code of the user in the other active codes in order from low power to high power to obtain the first active codes, the number of which equals the first threshold, if the number of the other active codes exceeds the first threshold; and
   utilizing the other active codes as the first active codes, if the number of the other active codes does not exceed the first threshold.

5. The joint detection method of claim 1 wherein the strong interference code is determined by:
   obtaining a maximum power $P_{code\_max}$ of all active codes of the user;
   calculating a ratio of power of the active code corresponding to the intra-frequency adjacent cell to the maximum power $P_{code\_max}$;
   obtaining a third active code with the ratio larger than the second threshold; and
   determining whether a ratio of average power of a first cell corresponding to the third active code to average power of the intra-frequency adjacent cell of the first cell exceeds a predefined threshold;
   if the ratio of average power of the first cell corresponding to the third active code to average power of the intra-frequency adjacent cell of the first cell exceeds the predefined threshold, determining that the third active code is the strong interference code; and
   if the ratio of average power of the first cell corresponding to the third active code to average power of the intra-frequency adjacent cell of the first cell does not exceed the predefined threshold, determining that the third active code is not the strong interference code.

6. A joint detection method comprising:
   determining if a number of original active windows corresponding to a cell and intra-frequency adjacent cells exceeds a third threshold,
   if the number of the original active windows exceeds the third threshold and one or more strong interference windows exist among active windows corresponding to the intra-frequency adjacent cells, obtaining a number of first active windows of the original active windows excluding the one or more strong interference windows, wherein the number of the first active windows does not exceed the third threshold, and wherein a ratio of power of each of the one or more strong interference windows to a power of an active window of a user exceeds a fourth threshold;
   determining one or more strong interference codes corresponding to the one or more strong interference windows and first active codes corresponding to the first active windows;
   applying an interference cancellation to a received signal to obtain a matched filtering result of a remaining signal excluding a strong interference signal corresponding to the one or more strong interference codes; and
   performing a joint detection by utilizing the first active codes and the matched filtering result of the remaining signal to obtain a first joint detection result.

7. The joint detection method of claim 6 further comprising:
   if the number of the original active windows does not exceed the third threshold, performing a joint detection by utilizing active codes corresponding to the active windows and a matched filtering result of the received signal to obtain a second joint detection result.

8. The joint detection method of claim 6 further comprising:
   if the number of the original active windows exceeds the third threshold and a strong interference window does not exist in the active windows corresponding to the intra-frequency adjacent cells, sequencing power of the original active windows and deleting active windows except for the active window of the user in the original active windows in order from low power to high power to retain a number of second active windows, the number of which equals the third threshold;
   determining second active codes corresponding to the second active windows; and
   performing a joint detection by utilizing the second active codes and a matched filtering result of the received signal to obtain a third joint detection result.

9. The joint detection method of claim 6 wherein obtaining a number of first active windows of the original active windows excluding the one or more strong interference windows comprises:
   determining whether the number of other active windows except for the strong interference window in the original active windows exceeds the third threshold;
   sequencing power of the other active windows, and deleting active windows except for the active window of the user in the other active windows in order from low power to high power to obtain the first active code, the number of which equals the third threshold, if the number of the other active windows exceeds the third threshold; and
   utilizing the other active windows as the first active windows, if the number of the first active windows does not exceed the third threshold.

10. The joint detection method of claim 6 further comprising determining the strong interference window by:
   obtaining a maximum power $P_{code\_max}$ of all active windows of the user;
   calculating a ratio of power of the active window corresponding to the intra-frequency adjacent cell to the maximum power $P_{code\_max}$;
   obtaining a third active window with the ratio larger than the fourth threshold; and
   determining whether a ratio of average power of a first cell corresponding to the third active window to average power of the intra-frequency adjacent cell of the first cell exceeds a predefined threshold;
   if the ratio of average power of the first cell corresponding to the third active window to the average power of the intra-frequency adjacent cell of the first cell exceeds the predefined threshold, determining that the third active window is the strong interference window; and if the ratio of average power of the first cell corresponding to the third active window to the average power of the intra-frequency adjacent cell of the first cell does not exceed the predefined threshold, determining that the third active code is not the strong interference code.

11. The joint detection method of claim 6 wherein prior to applying an interference cancellation to a received signal to obtain a matched filtering result of a remaining signal excluding a strong interference signal corresponding to the one or more strong interference codes, the method further comprises:

match filtering the received signal to obtain the matched filtering result of the receive signal;

selecting a part of the matched filtering result of the received signal corresponding to the strong interference code to obtain a matched filtering result of the strong interference signal; and mapping the matched filtering result of the strong interference signal to obtain the strong interference signal.

12. The joint detection method of claim 6 wherein applying an interference cancellation to a received signal to obtain a matched filtering result of a remaining signal excluding a strong interference signal corresponding to the one or more strong interference codes comprises:

selecting column vectors corresponding to the strong interference code to compose a second system submatrix corresponding to the strong interference signal from a system submatrix corresponding to the receive signal, column vectors corresponding to the first active codes compose a first system submatrix corresponding to the remaining signal;

cancelling a part of the received signal corresponding to the strong interference signal from the received signal to obtain the remaining signal, wherein the part corresponding to the strong interference signal is a product of a second system matrix corresponding to the second system submatrix and the strong interference signal; and match filtering the remaining signal by utilizing a first system matrix corresponding to the first system submatrix to obtain a matched filtering result of the remaining signal.

13. The joint detection method of claim 6 wherein applying an interference cancellation to a received signal to obtain a matched filtering result of a remaining signal excluding a strong interference signal corresponding to the one or more strong interference codes comprises:

selecting column vectors corresponding to the strong interference code to compose a second system submatrix corresponding to the strong interference signal from a system submatrix corresponding to the receive signal, column vectors corresponding to the first active codes compose a first system submatrix corresponding to the remaining signal;

calculating a product of a conjugate transpose matrix of the first system matrix corresponding to the first system submatrix, the second system matrix corresponding to the second system submatrix and the strong interference signal;

deleting a part of the matched filtering result of the received signal corresponding to the strong interference code from the matched filtering result of the received signal to obtain a remaining part; and subtracting the product from the remaining part to obtain a matched filtering result of the remaining signal.

14. A joint detection apparatus comprising:

a branch selector circuit configured to determine if a number of original active codes corresponding to a cell and intra-frequency adjacent cells exceeds a first threshold;

an obtaining circuit configured to obtain a number of first active codes of the original active codes excluding the one or more strong interference codes if the number of the original active codes exceeds the first threshold and one or more strong interference codes exist among active codes corresponding to the intra-frequency adjacent cells, wherein the number of the first active codes does not exceed the first threshold, and wherein a ratio of a power of each of the one or more strong interference codes to a power of an active code of a user exceeds a second threshold;

an interference cancellation circuit configured to apply, corresponding to the one or more strong interference codes and based on the one or more strong interference codes, an interference cancellation to a received signal to obtain a matched filtering result of a remaining signal excluding a strong interference signal corresponding to the one or more strong interference codes; and a first joint detector circuit configured to perform a joint detection by utilizing the first active codes and the matched filtering result of the remaining signal to obtain a first joint detection result.

15. The joint detection apparatus of claim 14 further comprising:

a second joint detector circuit configured to perform a joint detection by utilizing the original active codes and a matched filtering result of the received signal to obtain a second joint detection result, if the number of the original active codes does not exceed the first threshold.

16. The joint detection apparatus of claim 14 further comprising:

a code deleting circuit configured to:

sequence power of the original active codes and delete active codes except for the active codes of the user in the original active codes in order from low power to high power, to retain a number of second active codes, the number of which equals the first threshold, if the number of the original active codes exceeds the first threshold and a strong interference code does not exist among the active code corresponding to the intra-frequency adjacent cells; and sequence power of the original active codes and delete active codes except for the active codes of the user in the original active codes in the order from low power to high power, to retain a number of second active codes, the number of which equals the first threshold; and a third joint detector circuit configured to perform a joint detection by utilizing the second active codes and a matched filtering result of the received signal to obtain a third joint detection result.

17. The joint detection apparatus of claim 14 wherein the obtaining circuit comprises on or more circuits configured to:

determine whether the number of other active codes except for the strong interference code in the original active codes exceeds the first threshold;

sequence power of the other active codes and delete the active codes except for the active code of the user in the other active codes in order from low power to high power to obtain the first active codes, the number of which equals the first threshold, if the number of the other active codes exceeds the first threshold; and utilize the other active codes as the first active codes, if the number of the other active codes does not exceed the first threshold.

18. The joint detection apparatus of claim 14 further comprising a strong interference code determining circuit, the strong interference determining circuit comprising one or more circuits configured to:
- obtain a maximum power $P_{code\_max}$ of all active codes of the user;
- calculate a ratio of power of the active code corresponding to the intra-frequency adjacent cell to the maximum power $P_{code\_max}$;
- obtain a third active code with the ratio larger than the second threshold;
- determine whether a ratio of average power of a first cell corresponding to the third active code to average power of the intra-frequency adjacent cell of the first cell exceeds a predefined threshold;
- if the ratio of average power of the first cell corresponding to the third active code to the average power of the intra-frequency adjacent cell of the first cell exceeds the predefined threshold, determine that the third active code is the strong interference code; and
- if the ratio of average power of the first cell corresponding to the third active code to the average power of the intra-frequency adjacent cell of the first cell does not exceed the predefined threshold, determine that the third active code is not the strong interference code.

19. A joint detection apparatus comprising:
- a branch selector circuit configured to determine if a number of original active windows corresponding to a cell and intra-frequency adjacent cells exceeds a third threshold;
- an obtaining circuit configured to obtain a number of first active windows of the original active windows excluding the one or more strong interference windows if the number of the original active windows exceeds the third threshold and one or more strong interference windows exist among active windows corresponding to the intra-frequency adjacent cells, wherein the number of the first active windows does not exceed the third threshold, and wherein a ratio of power of each of the one or more strong interference window to a power of an active window of a user exceeds a fourth threshold;
- a first determining circuit configured to determine a strong interference code corresponding to the strong interference window and first active codes corresponding to the first active windows;
- an interference cancellation circuit configured to apply an interference cancellation to a received signal to obtain a matched filtering result of a remaining signal excluding a strong interference signal corresponding to the one or more strong interference code; and
- a first joint detector circuit configured to perform a joint detection by utilizing the first active codes and the matched filtering result of the remaining signal to obtain a first joint detection result.

20. The joint detection apparatus of claim 19 further comprising:
- a second joint detector circuit configured to perform a joint detection by utilizing active codes corresponding to the active windows and a matched filtering result of the received signal to obtain a second joint detection result, if the number of the original active windows does not exceed the third threshold.

21. The joint detection apparatus of claim 19 further comprising:
- a window deleting circuit configured to sequence power of the original active windows and delete active windows except for the active window of the user in the original active windows in order from low power to high power to retain a second active windows, the number of which is the third threshold, if the number of the original active windows exceeds the third threshold and a strong interference window does not exist in the active windows corresponding to the intra-frequency adjacent cells;
- a second determining circuit configured to determine second active codes corresponding to the second active windows; and
- a third joint detector circuit configured to perform a joint detection by utilizing the second active codes and the matched filtering result of the received signal to obtain a third joint detection result.

22. The joint detection apparatus of claim 19 wherein the obtaining circuit comprises one or more subunit circuits which are configured to:
- determine whether the number of other active windows except for the strong interference window in the original active windows exceeds the third threshold;
- sequence power of the other active windows, and delete active windows except for the active window of the user in the other active windows in the order from low power to high power to obtain the first active codes, the number of which is the third threshold, if the number of the other active windows exceeds the third threshold; and
- utilize the other active windows as the first active windows, if the number of the first active windows does not exceed the third threshold.

23. The joint detection apparatus of claim 19 further comprising a strong interference window determining circuit comprising one or more subunit circuits configured to:
- obtain a maximum power $P_{code\_max}$ of all active windows of the user;
- calculate a ratio of power of the active window corresponding to the intra-frequency adjacent cell to the maximum power $P_{code\_max}$;
- obtain a third active window with the ratio larger than the fourth threshold; and
- determine whether a ratio of average power of a first cell corresponding to the third active window to average power of the intra-frequency adjacent cell of the first cell exceeds a predefined threshold;
- if the ratio of the average power of the first cell corresponding to the third active window to the average power of the intra-frequency adjacent cell of the first cell exceeds the predefined threshold, determining that the third active window is the strong interference window; and
- if the ratio of the average power of the first cell corresponding to the third active window to the average power of the intra-frequency adjacent cell of the first cell does not exceed the predefined threshold, determining that the third active window is not the strong interference window.

24. The joint detection apparatus of claim 19 further comprising a strong interference signal determining circuit comprising one or more subunit circuits configured to:
- match filter the received signal to obtain the matched filtering result of the receive signal;
- select a part of the matched filtering result of the received signal corresponding to the strong interference code to obtain a matched filtering result of the strong interference signal; and map the matched filtering result of the strong interference signal to obtain the strong interference signal.

25. The joint detection apparatus of claim 24 wherein the interference cancellation circuit comprises one or more sub-unit circuits configured to:
   select column vectors corresponding to the strong interference code to compose a second system submatrix corresponding to the strong interference signal from a system submatrix corresponding to the receive signal, column vectors corresponding to the first active codes compose a first system submatrix corresponding to the remaining signal;
   cancel a part of the received signal corresponding to the strong interference signal from the received signal to obtain the remaining signal, the part corresponding to the strong interference signal is a product of a second system matrix corresponding to the second system submatrix and the strong interference signal; and
   match filter the remaining signal by utilizing a first system matrix corresponding to the first system submatrix to obtain a matched filtering result of the remaining signal.

26. The joint detection apparatus of claim 24 wherein the interference cancellation unit comprises one or more subunits which are configured to:
   select column vectors corresponding to the strong interference code to compose a second system submatrix corresponding to the strong interference signal from a system submatrix corresponding to the receive signal, column vectors corresponding to the first active codes compose a first system submatrix corresponding to the remaining signal;
   calculate a product of a conjugate transpose matrix of the first system matrix corresponding to the first system submatrix, the second system matrix corresponding to the second system submatrix and the strong interference signal;
   delete a part of the matched filtering result of the received signal corresponding to the strong interference code from the matched filtering result of the received signal to obtain a remaining part; and
   subtract the product from the remaining part to obtain a matched filtering result of the remaining signal.

27. A receiver comprising:
   a joint detection apparatus comprising:
      a branch selector circuit configured to determine if a number of original active codes corresponding to a cell and intra-frequency adjacent cells exceeds a first threshold;
      an obtaining circuit configured to obtain a number of first active codes of the original active codes excluding the one or more strong interference codes if the number of the original active codes exceeds the first threshold and one or more strong interference codes exist among active codes corresponding to the intra-frequency adjacent cells, wherein the number of the first active codes does not exceed the first threshold, and wherein a ratio of a power of each of the one or more strong interference codes to a power of an active code of a user exceeds a second threshold;
      an interference cancellation circuit configured to apply, corresponding to the one or more strong interference codes and based on the one or more strong interference codes, an interference cancellation to a received signal to obtain a matched filtering result of a remaining signal excluding a strong interference signal corresponding to the one or more strong interference codes; and
      a first joint detector circuit configured to perform a joint detection by utilizing the first active codes and the matched filtering result of the remaining signal to obtain a first joint detection result.

28. A receiver comprising:
   a joint detection apparatus comprising:
      a branch selector circuit configured to determine if a number of original active windows corresponding to a cell and intra-frequency adjacent cells exceeds a third threshold;
      an obtaining circuit configured to obtain a number of first active windows of the original active windows excluding the one or more strong interference windows if the number of the original active windows exceeds the third threshold and one or more strong interference windows exist among active windows corresponding to the intra-frequency adjacent cells, wherein the number of the first active windows does not exceed the third threshold, and wherein a ratio of power of each of the one or more strong interference window to a power of an active window of a user exceeds a fourth threshold;
      a first determining circuit configured to determine a strong interference code corresponding to the strong interference window and first active codes corresponding to the first active windows;
      an interference cancellation circuit configured to apply an interference cancellation to a received signal to obtain a matched filtering result of a remaining signal excluding a strong interference signal corresponding to the one or more strong interference code; and
      a first joint detector circuit configured to perform a joint detection by utilizing the first active codes and the matched filtering result of the remaining signal to obtain a first joint detection result.

29. A non-transitory computer program product comprising a computer readable medium having a computer program stored thereon, the computer program comprising program instructions loadable into a processor circuit of a joint detection apparatus, and configured to control the processor circuit to:
   determine if a number of original active codes corresponding to a cell and intra-frequency adjacent cells exceeds a first threshold;
   if the number of the original active codes is beyond the first threshold and one or more strong interference codes exist among active codes corresponding to the intra-frequency adjacent cells, obtain a number of first active codes of the original active codes excluding the one or more strong interference codes, wherein the number of the first active codes does not exceed the first threshold, and wherein a ratio of a power of each of the one or more strong interference codes to a power of an active code of a user exceeds a second threshold;
   apply, based on the one or more strong interference codes, an interference cancellation to a received signal to obtain a matched filtering result of a remaining signal excluding a strong interference signal corresponding to the one or more strong interference codes; and
   perform a joint detection by utilizing the first active codes and the matched filtering result of the remaining signal to obtain a first joint detection result.

* * * * *